(12) United States Patent
Chen et al.

(10) Patent No.: US 12,535,686 B2
(45) Date of Patent: Jan. 27, 2026

(54) NEAR-EYE OPTICAL DISPLAY APPARATUS

(71) Applicant: Coretronic Corporation, Hsin-Chu (TW)

(72) Inventors: Ping-Yen Chen, Hsin-Chu (TW); Chung-Yang Fang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/331,148

(22) Filed: Jun. 7, 2023

(65) Prior Publication Data
US 2023/0408825 A1    Dec. 21, 2023

Related U.S. Application Data

(60) Provisional application No. 63/350,871, filed on Jun. 10, 2022.

(30) Foreign Application Priority Data

Aug. 17, 2022 (CN) .......................... 202210985170.4
Oct. 17, 2022 (CN) .......................... 202211267216.5

(51) Int. Cl.
     *G02B 27/01*      (2006.01)
     *G02F 1/1335*      (2006.01)
     (Continued)

(52) U.S. Cl.
     CPC ... *G02B 27/0172* (2013.01); *G02F 1/133531* (2021.01); *G02F 1/133638* (2021.01);
     (Continued)

(58) Field of Classification Search
     CPC ............ G02F 2203/48; G02F 2202/04; G02F 1/133742; G02F 1/133638;
     (Continued)

(56) References Cited

U.S. PATENT DOCUMENTS

2013/0093968 A1*   4/2013   Yanai .................... G02F 1/1313
                                                              349/15
2019/0162991 A1*   5/2019   Hagiwara ............. G02F 1/1335
     (Continued)

FOREIGN PATENT DOCUMENTS

CN           112673299          4/2021

*Primary Examiner* — Mariam Qureshi
(74) *Attorney, Agent, or Firm* — JCIPRNET

(57) ABSTRACT

A near-eye optical display apparatus includes an optical waveguide, an image beam source, and an electrically controlled liquid crystal cell. The image beam source is disposed on one side of a first light incident surface to provide an image beam. After being transmitted through the optical waveguide, the image beam exits from the light-exit surface. The liquid crystal cell is disposed on one side of a second light incident surface, and has a first sight region and a second sight region disposed in a first direction. When a driving voltage is supplied to the liquid crystal cell, the percentage of ratio of an average transmittance of the second sight region for an ambient beam and an average transmittance of the first sight region for the ambient beam is less than or equal to 50%. The display contrast of the near-eye optical display apparatus proposed by the invention is not easily affected by the external environment.

13 Claims, 24 Drawing Sheets

(51) Int. Cl.
*G02F 1/13363* (2006.01)
*G02F 1/1337* (2006.01)

(52) U.S. Cl.
CPC ............... *G02F 1/133742* (2021.01); *G02B 2027/0118* (2013.01); *G02B 2027/0178* (2013.01); *G02F 2202/04* (2013.01); *G02F 2203/48* (2013.01); *G02F 2413/01* (2013.01); *G02F 2413/02* (2013.01)

(58) Field of Classification Search
CPC ...... G02F 1/133531; G02B 2027/0178; G02B 2027/0118; G02B 27/0172
See application file for complete search history.

(56) References Cited

U.S. PATENT DOCUMENTS

| | | | |
|---|---|---|---|
| 2021/0033898 A1* | 2/2021 | Woodgate | G02F 1/137 |
| 2023/0129018 A1* | 4/2023 | Zhu | G02B 27/0179 349/13 |

* cited by examiner

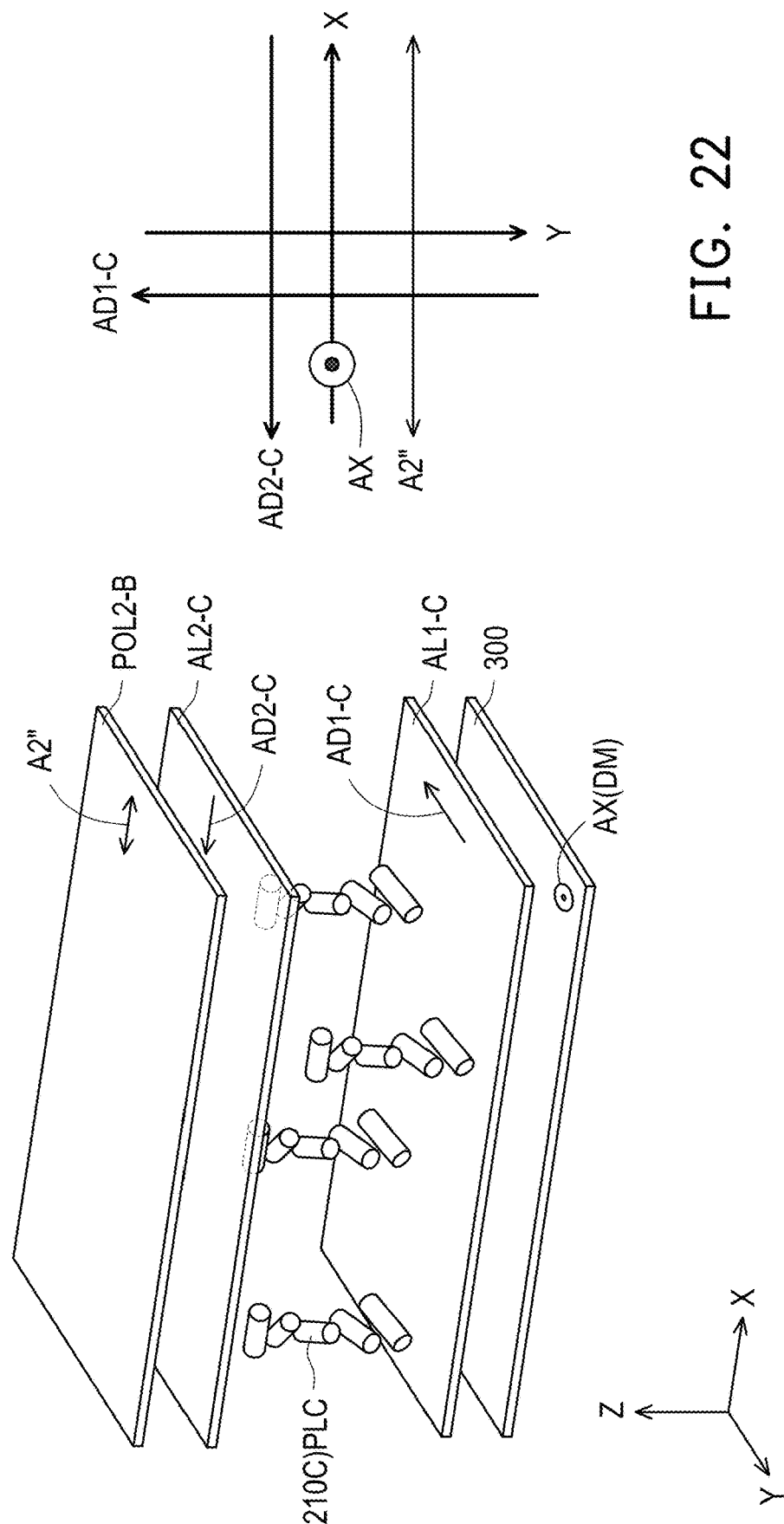

NEAR-EYE OPTICAL DISPLAY APPARATUS

CROSS-REFERENCE TO RELATED APPLICATION

This application claims the priority benefit of U.S. provisional application Ser. No. 63/350,871, filed on Jun. 10, 2022, China application serial no. 202211267216.5, filed on Oct. 17, 2022 and China application serial no. 202210985170.4, filed on Aug. 17, 2022. The entirety of each of the above-mentioned patent applications is hereby incorporated by reference herein and made a part of this specification.

BACKGROUND

Technical Field

The invention relates to a display apparatus, particularly to a near-eye optical display apparatus.

Description of Related Art

Augmented reality (AR) is a technology that combines virtual-world information such as visual effects, sound effects, or spatial information with that of the real world. As it displays simultaneously the virtual information and the real-world information, VR may be used in various fields including entertainment, learning, and medical operations. However, the display contrast of the image may be compromised by the high-brightness background of the real world when the existing AR device is placed in a bright location (in the outdoors, for example), resulting in poor visual experience.

The information disclosed in this Background section is only for enhancement of understanding of the background of the described technology and therefore it may contain information that does not form the prior art that is already known to a person of ordinary skill in the art. Furthermore, the information disclosed in the Background section does not mean that one or more problems to be resolved by one or more embodiments of the invention was acknowledged by a person of ordinary skill in the art.

SUMMARY

The invention provides a near-eye optical display apparatus with a display contrast not affected easily by the external environment.

Other objects and advantages of the invention may be further understood from the technical features disclosed in the invention.

To achieve one or part or all of the above objectives or other objectives, an embodiment of the invention provides a near-eye optical display apparatus. The near-eye optical display apparatus includes an optical waveguide, an image beam source, and an electrically controlled liquid crystal cell. The optical waveguide has a first light incident surface, and a light-exit surface and a second light incident surface that are respectively connected to the first light incident surface and are opposite to each other. The image beam source is disposed on one side of the first light incident surface of the optical waveguide and is adapted to provide an image beam. The image beam exits from the light-exit surface after being transmitted through the optical waveguide. The electrically controlled liquid crystal cell is disposed on one side of the second light incident surface of the optical waveguide, and has a first sight region and a second sight region. The first sight region and the second sight region are disposed in a first direction. The first sight region relative to a viewing angle range of a human eye pupil ranges from -30 degrees to 30 degrees in the first direction. The second sight region relative to a viewing angle range of the human eye pupil is greater than 35 degrees in the first direction. When a driving voltage is supplied to the electrically controlled liquid crystal cell, the percentage of ratio of the average transmittance of the second sight region of the electrically controlled liquid crystal cell for the ambient beam and the average transmittance of the first sight region of the electrically controlled liquid crystal cell for the ambient beam is less than or equal to 50%.

Based on the above, in the near-eye optical display apparatus of an embodiment of the invention, the electrically controlled liquid crystal cell disposed away from the light-exit surface of the optical waveguide has a first sight region and a second sight region. The first sight region relative to a viewing angle range of the human eye pupil ranges from -30 degrees to 30 degrees, while the second sight region relative to a viewing angle range of the human eye pupil is greater than 35 degrees. When the user operates the near-eye optical display apparatus in a bright environment, the electrically controlled liquid crystal cell may be enabled to make the percentage of ratio of the average transmittance of the second sight region for the ambient beam and the average transmittance of the first sight region for the ambient beam less than or equal to 50% to increase the display contrast of the near-eye optical display apparatus in the second sight region, so as to improve the visual experience of the user.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 21 is a schematic diagram of part of the film layers of the electrically controlled liquid crystal cell according to the fifth embodiment of the invention.

FIG. 22 is a schematic diagram showing the relationship between the axial direction of the absorption axis of the polarizing layer and the alignment direction of the alignment layer in FIG. 21.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
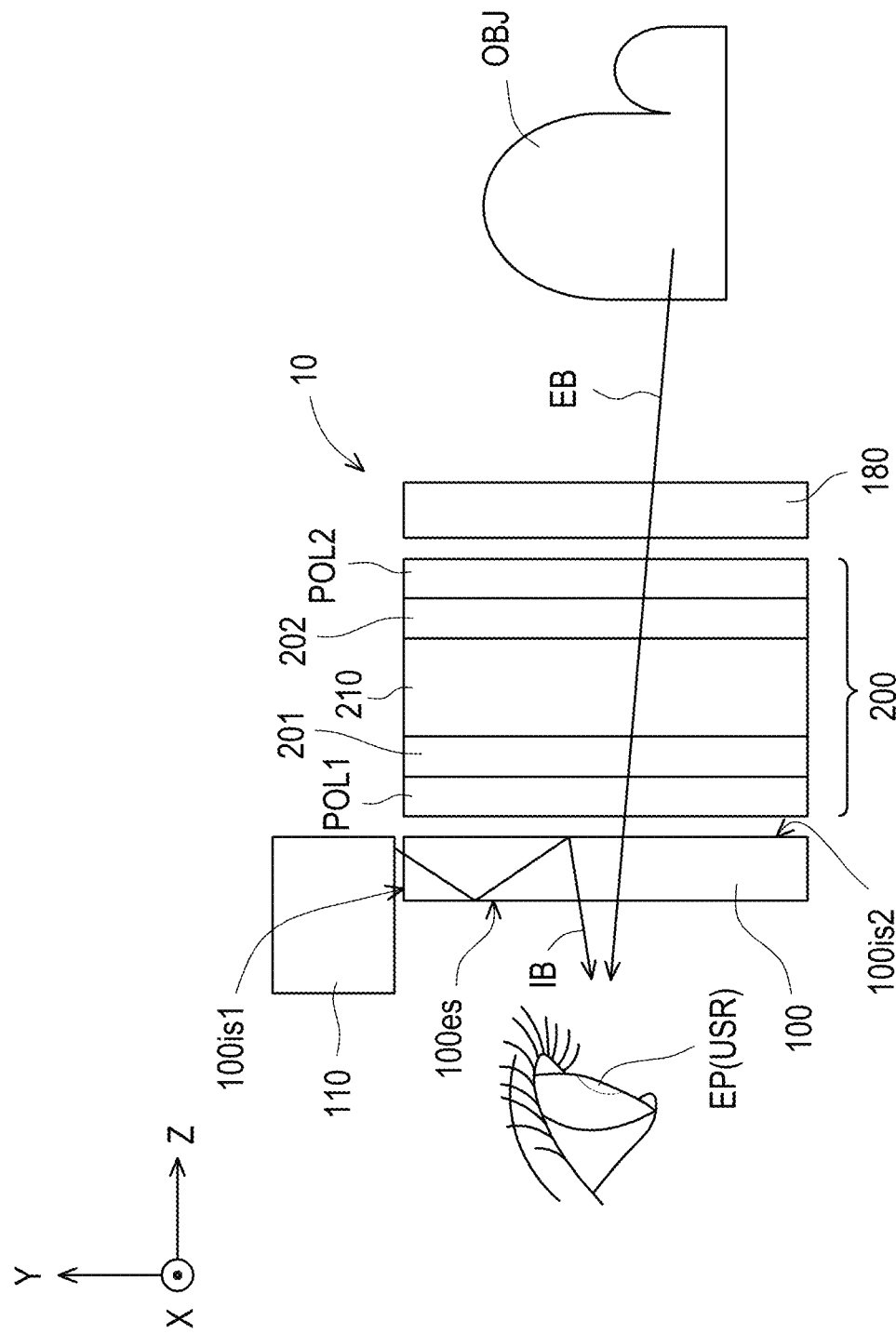
FIG. 1 is a schematic diagram of a near-eye optical display apparatus according to a first embodiment of the invention.
Figure 3:
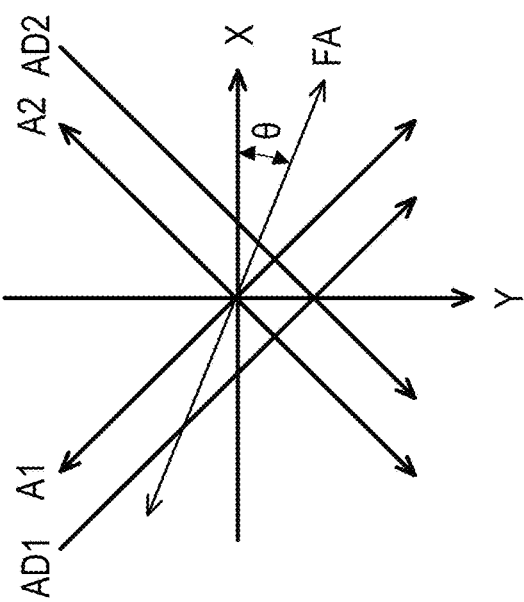
FIG. 3 is a schematic diagram showing the relationship among the absorption axis of the polarizing layer, the alignment direction of the alignment layer, and the axial direction of the slow axis of the half-wave plate in FIG. 2.
Figure 2:
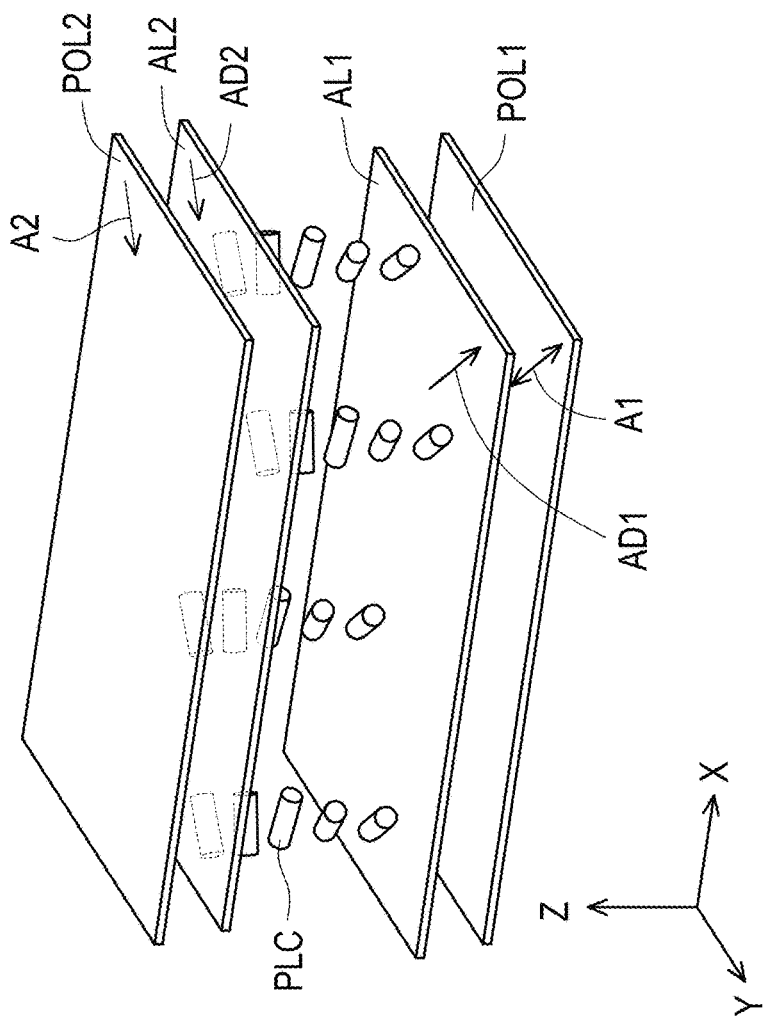
FIG. 2 is a schematic diagram of part of the film layers of the electrically controlled liquid crystal cell in FIG. 1.
Figure 4A:
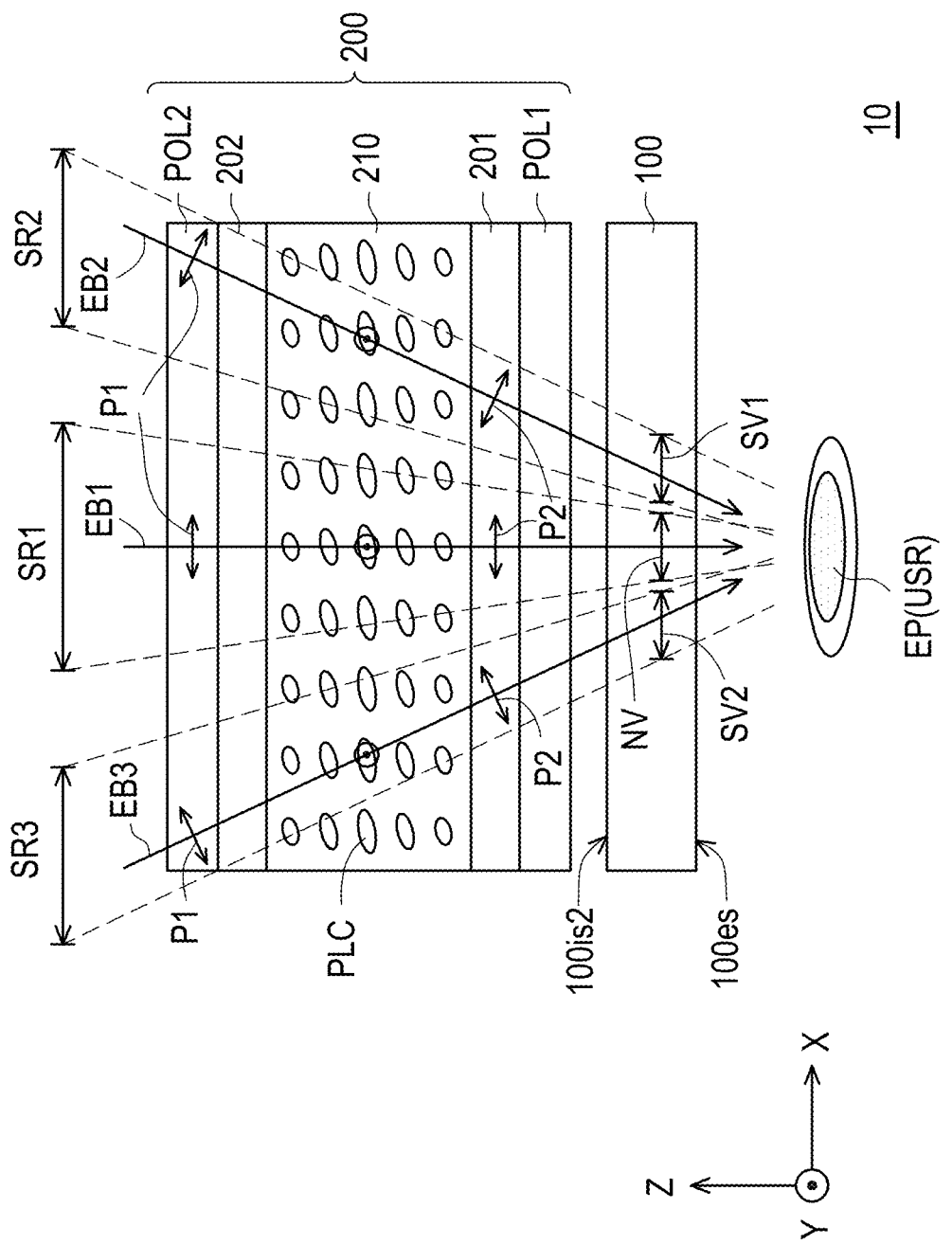
FIG. 4A is a schematic side view of the near-eye optical display apparatus in FIG. 1 when the electrically controlled liquid crystal cell is disabled.
Figure 4B:
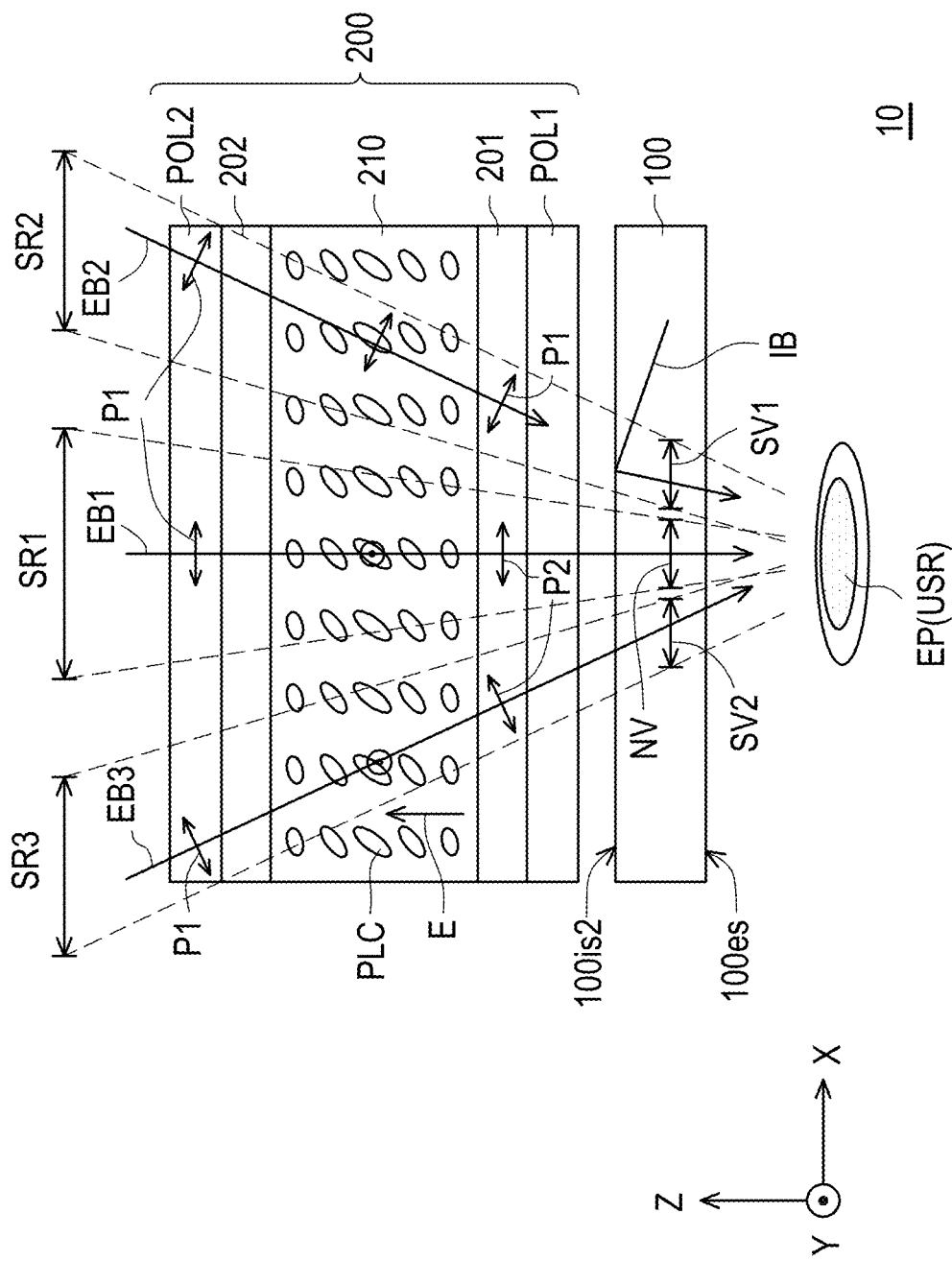
FIG. 4B is a schematic side view of the near-eye optical display apparatus in FIG. 1 when the electrically controlled liquid crystal cell is enabled.
Figure 5B:
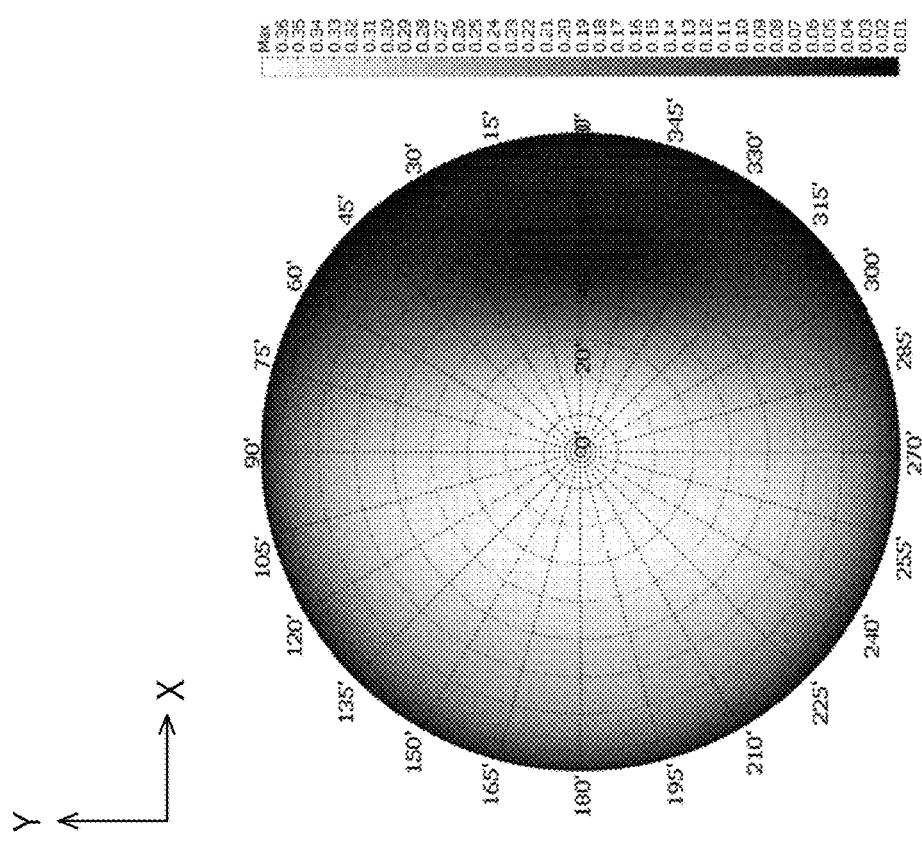
FIG. 5B is a transmittance distribution diagram of the near-eye optical display apparatus in FIG. 4B.
Figure 5A:
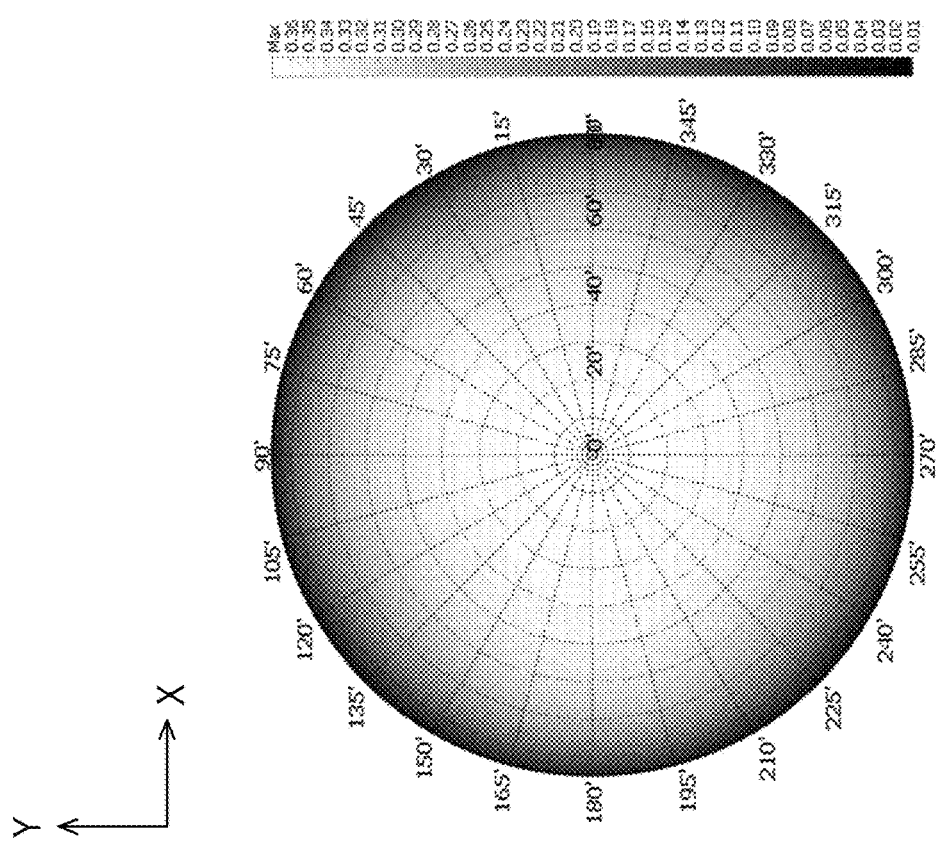
FIG. 5A is a transmittance distribution diagram of the near-eye optical display apparatus in FIG. 4A.
Figure 6A:
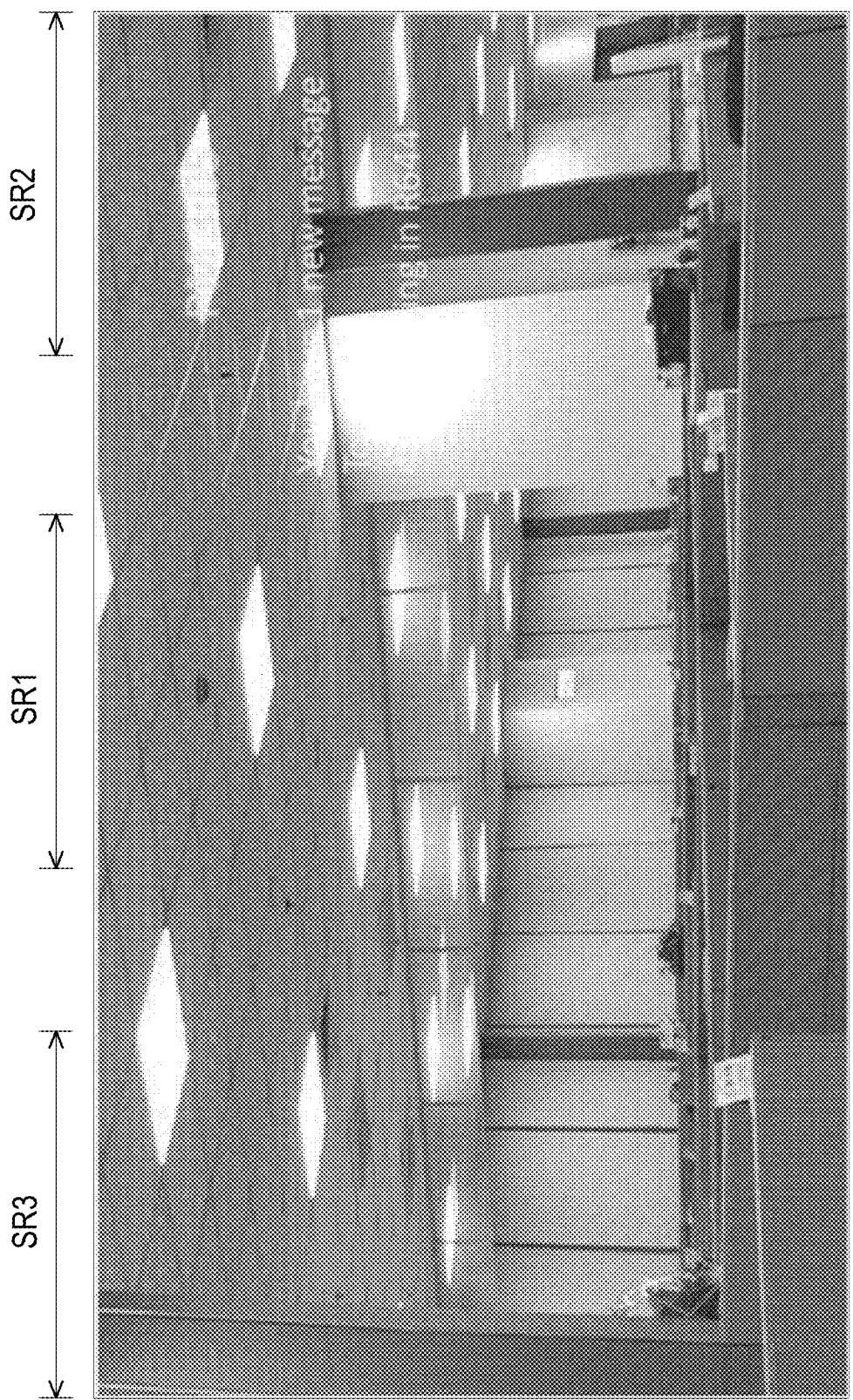
FIG. 6A is a schematic diagram of a superimposition of a scene and a displayed image viewed by the human eye pupil from the near-eye optical display apparatus in FIG. 4A.
Figure 6B:
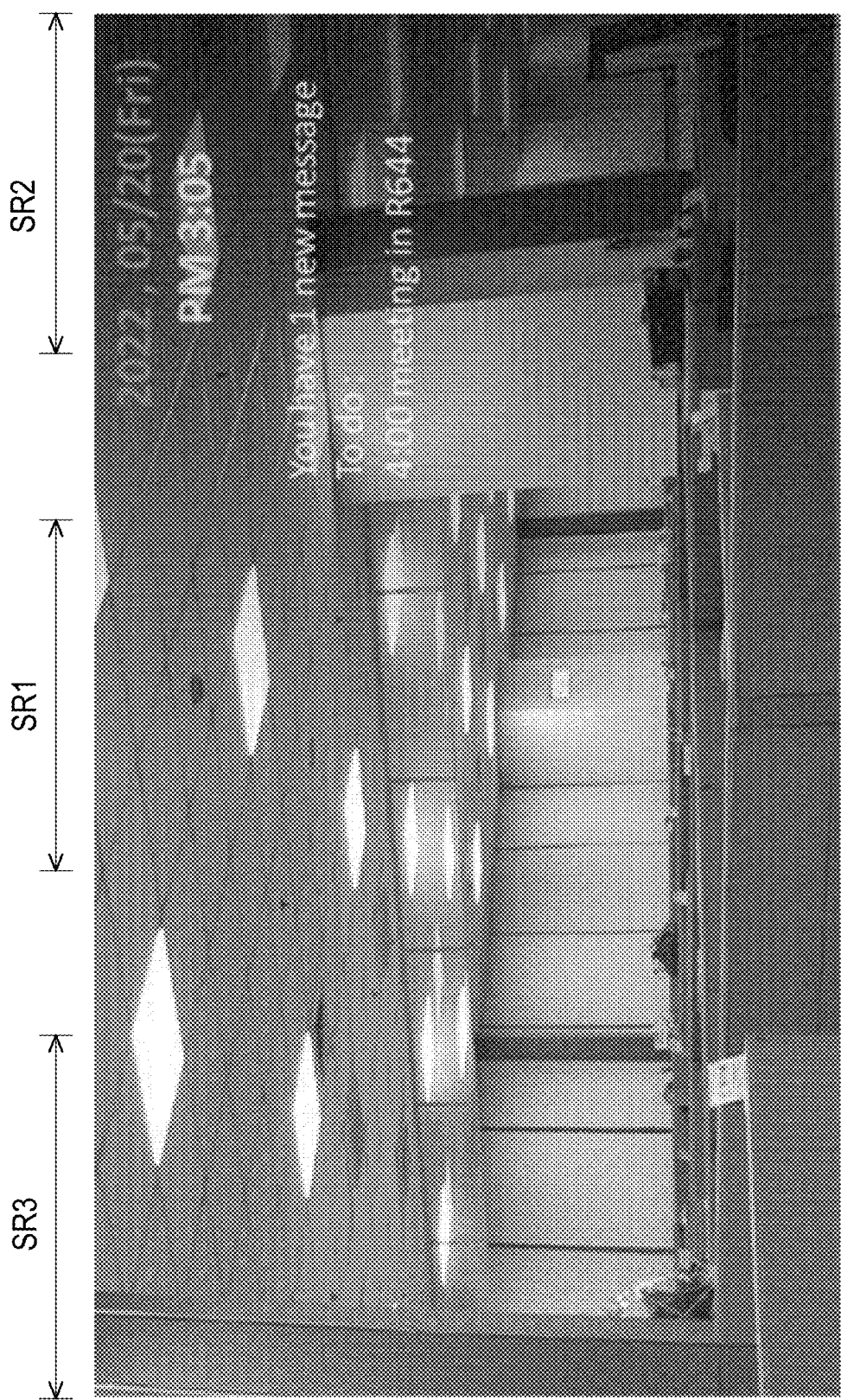
FIG. 6B is a schematic diagram of the superposition of the scene and the displayed image seen by the human eye pupil from the near-eye optical display apparatus in FIG. 4B.

FIG. 1 is a schematic diagram of a near-eye optical display apparatus according to a first embodiment of the invention. FIG. 2 is a schematic diagram of part of the film layers of the electrically controlled liquid crystal cell in FIG. 1. FIG. 3 is a schematic diagram showing the relationship among the absorption axis of the polarizing layer, the alignment direction of the alignment layer, and the axial direction of the slow axis of the half-wave plate in FIG. 2. FIG. 4A is a schematic side view of the near-eye optical display apparatus in FIG. 1 when the electrically controlled liquid crystal cell is disabled. FIG. 4B is a schematic side view of the near-eye optical display apparatus in FIG. 1 when the electrically controlled liquid crystal cell is enabled. FIG. 5A is a transmittance distribution diagram of the near-eye optical display apparatus in FIG. 4A. FIG. 5B is a transmittance distribution diagram of the near-eye optical display apparatus in FIG. 4B. FIG. 6A is a schematic diagram of a superimposition of a scene and a displayed image viewed by the human eye pupil from the near-eye optical display apparatus in FIG. 4A. FIG. 6B is a schematic diagram of the superposition of the scene and the displayed image seen by the human eye pupil from the near-eye optical display apparatus in FIG. 4B. For the sake of clarity, the image beam source 110 and the half-wave plate 180 in FIG. 1 are omitted in FIG. 4A and FIG. 4B.

As shown in FIG. 1, the near-eye optical display apparatus 10 includes an optical waveguide 100, an image beam source 110, and an electrically controlled liquid crystal cell 200. The optical waveguide 100 has a first light incident surface 100is1, a second light incident surface 100is2, and a light-exit surface 100es. The second light incident surface 100is2 and the light-exit surface 100es are respectively connected to the first light incident surface 100is1 and are opposite to each other. The image beam source 110 is disposed on one side of the first light incident surface 100is1 of the optical waveguide 100, and it is adapted to provide the image beam IB to the first light incident surface 100is1. The image beam IB is transmitted through the optical waveguide 100 and then exits from the light-exit surface 100es.

The eyes of the user USR may be on one side of the light-exit surface 100es of the optical waveguide 100. After the image beam IB exits from the light-exit surface 100es of the optical waveguide 100, it enters (transmits to) the human eye pupil EP of a user USR to be observed by the user USR. That is to say, the light-exit surface 100es of the optical waveguide 100 is provided with the display area of the near-eye optical display apparatus 10. Meanwhile, a real-world object OBJ on one side of the second light incident surface 100is2 of the optical waveguide 100 is illuminated by external light to generate an ambient beam EB (or the real-world object OBJ can actively generate the ambient beam EB). The ambient beam EB is observed by the user USR through the optical waveguide 100.

The image beam source 110 projects the image beam IB to the human eye through the transmission of the optical waveguide 100 and generates a virtual image (such as a text image or an image) to be displayed, and the displayed image generated by the image beam source 110 may be merged with (the ambient beam EB of) the real-world object OBJ. More specifically, the near-eye optical display apparatus 10 may be, but the disclosure is not limited thereto, glasses with augmented reality (AR) technology.

The near-eye optical display apparatus 10 further includes an electrically controlled liquid crystal cell 200. The electrically controlled liquid crystal cell 200 is on one side of the second light incident surface 100is2 of the optical waveguide 100, and it overlaps the second light incident surface 100is2. In order to give the user USR a better visual experience, the electrically controlled liquid crystal cell 200 is adapted to adjust the light intensity of the ambient beam EB from different sight regions based on different environments, as a way to optimize the fusion effect of the displayed image generated by the image beam source 110 and the real-world object OBJ.

It is worth mentioning that since the image beam IB emitted by the image beam source 110 and transmitted through the optical waveguide 100 is directly projected to the human eye pupil EP through the light-exit surface 100es, the image beam IB is not affected by the electrically controlled liquid crystal cell 200. Therefore, even if the electrically controlled liquid crystal cell 200 is enabled, the brightness of the image beam IB showing a white image is substantially the same in different regions on the light-exit surface 100es of the optical waveguide 100.

Please refer to FIG. 1, FIG. 4A, and FIG. 4B. For example, the electrically controlled liquid crystal cell 200 has a third sight region SR3, a first sight region SR1, and a second sight region SR2 disposed in a direction X (i.e., the first direction). The direction X here is, for example, the horizontal line of sight of the user USR. These sight regions overlap the display areas on the light-exit surface 100es of the optical waveguide 100 in the direction of the line of sight (i.e., the direction Z) of the user USR.

Furthermore, the first sight region SR1 relative to the viewing angle range of the human eye pupil EP (e.g. visual field of the human eye pupil EP) in the direction X ranges from −30 degrees to 30 degrees (e.g., the first sight region SR1 is the viewing angle range of the human eye pupil EP of between −30 degrees and 30 degrees in the first direction). The second sight region SR2 relative to the viewing angle range of the human eye pupil EP is greater than 35 degrees in the direction X (e.g., the second sight region SR2 is a viewing angle range of the human eye pupil EP of greater than 35 degrees in the first direction) and is less than the positive viewing angle of the edge of the electrically controlled liquid crystal cell 200 relative to the human eye pupil EP (e.g., less than 60 degrees). The third sight region SR3 relative to the viewing angle range of the human eye pupil EP is less than −35 degrees in the direction X and is greater than the negative viewing angle of the other edge of the electrically controlled liquid crystal cell 200 relative to the human eye pupil EP (e.g., greater than −60 degrees). The viewing angle range here is, for example, defined by the angle between the line connecting each point in the sight region and the geometric center of the human eye pupil EP (e.g., a center of an eye box of the near-eye optical display apparatus 10) and the normal direction of the light-exit surface 100es of the optical waveguide 100.

In other words, the sight region of the near-eye optical display apparatus 10 may also be defined by the display area on the light-exit surface 100es of the optical waveguide 100. For example, the middle block (that is, the normal view area NV) of the display area is defined as the first sight region SR1, whereas the two side blocks (i.e., the first side-view area SV1 and the second side-view area SV2) respectively on opposite sides of the middle block in the display area are respectively defined as the second sight region SR2 and the third sight region SR3. More specifically, in the direction of the line of sight of the user USR, the normal view area NV, the first side-view area SV1, and the second side-view area SV2 of the light-exit surface 100es respectively overlap the first sight region SR1, the second sight region SR2, and the third sight region SR3 (angles of the direction of the lines of sight are, for example, 0 degrees, 45 degrees and −45 degrees, respectively). The two side blocks in the display area of the light-exit surface 100es may exhibit symmetrical distribution or asymmetric distribution relative to the middle block, and the area of each block may be the same with or different from each other.

Please refer to FIG. 1 to FIG. 3. In this embodiment, the electrically controlled liquid crystal cell 200 includes a first substrate 201, a second substrate 202, a first polarizing layer POL1, a second polarizing layer POL2, a first alignment layer AL1, a second alignment layer AL2, and a liquid crystal layer 210. The first alignment layer AL1 and the second alignment layer AL2 are disposed between the first polarizing layer POL1 and the second polarizing layer POL2. The liquid crystal layer 210 is sandwiched between the first alignment layer AL1 and the second alignment layer AL2. The first alignment layer AL1 is disposed between the first substrate 201 and the liquid crystal layer 210. The second alignment layer AL2 is disposed between the second substrate 202 and the liquid crystal layer 210. The first polarizing layer POL1 is disposed on one side of the first substrate 201 away from the first alignment layer AL1, and the second polarizing layer POL2 is disposed on one side of the second substrate 202 away from the second alignment layer AL2.

The first polarizing layer POL1 and the second polarizing layer POL2 respectively have a first absorption axis A1 and a second absorption axis A2. The first alignment layer AL1 and the second alignment layer AL2 respectively have a first alignment direction AD1 and a second alignment direction AD2. For example, in this embodiment, the first absorption axis A1 of the first polarizing layer POL1 is perpendicular to the second absorption axis A2 of the second polarizing layer POL2; the first alignment direction AD1 of the first alignment layer AL1 is perpendicular to the second alignment direction AD2 of the second alignment layer AL2; the first absorption axis A1 of the first polarizing layer POL1 is parallel to the first alignment direction AD1 of the first alignment layer AL1; the second absorption axis A2 of the second polarizing layer POL2 is parallel to the second alignment direction AD2 of the second alignment layer AL2, but the disclosure is not limited thereto. In other embodiments, the first absorption axis A1 is perpendicular to the first alignment direction AD1, and the second absorption axis A2 is perpendicular to the second alignment direction AD2.

Note that in this embodiment, the included angle between the first alignment direction AD1 and the second alignment direction AD2 and the direction X is 45 degrees. For example, the first alignment direction AD1 is defined by the clockwise deflection of the direction X by 45 degrees with the direction Z as the center, and the second alignment direction AD2 is defined by 135 degrees of clockwise deflection of the direction X with the direction Z as the center (as shown in FIG. 2 and FIG. 3). Therefore, when no electric field is applied, a configuration of the positive liquid crystal molecules PLC of the liquid crystal layer 210 twisted from the first alignment layer AL1 to the second alignment layer AL2 is formed (as shown in FIG. 2 and FIG. 4A). In other words, the liquid crystal layer 210 of this embodiment is driven by the mechanism of the twisted nematic (TN) effect.

Please refer to FIG. 4A and FIG. 5A. When the electrically controlled liquid crystal cell 200 is disabled (for example, no driving voltage is supplied to the electrically controlled liquid crystal cell), the first sight region SR1 (the area where the viewing angle range is between −30 degrees and 30 degrees in the direction X), the second sight region SR2 (the area where the viewing angle range is greater than 35 degrees in the direction X), and the third sight region SR3 (the area where the viewing angle range is less than −35 degrees in the direction X) have roughly the same average transmittance respectively for the ambient beam EB1 (i.e., the ambient beam passing through the first sight region SR1 and incident on the human eye pupil EP), the ambient beam EB2 (i.e., the ambient beam passing through the second sight region SR2 and incident on the human eye pupil EP), and the ambient beam EB3 (i.e., the ambient beam passing through the third sight region SR3 and incident on the human eye pupil EP) incident on the human eye pupil EP (as shown in FIG. 5A). The difference in the average transmittance of each of these sight regions is within 5% for the ambient beam EB, for example. The average transmittance here is, for example, the average transmittance of the sight regions of the electrically controlled liquid crystal cell 200 for multiple ambient beams EB that pass through the sight region and enter the human eye pupil EP at different angles (for example, each angle within the viewing angle range that corresponds to the sight regions).

From another point of view, when no driving voltage is supplied to the electrically controlled liquid crystal cell 200 (as shown in FIG. 4A), the first sight region SR1 and the second sight region SR2 of the electrically controlled liquid crystal cell 200 have the same average transmittance for the vertically incident ambient beam (perpendicular to the second light incident surface 100is2, for example); the first sight region SR1 and the second sight region SR2 of the electrically controlled liquid crystal cell 200 have the same average transmittance for the 45-degree incident ambient beam; and the average transmittance of the first sight region SR1 of the electrically controlled liquid crystal cell 200 for the vertically incident ambient beam is the same as the average transmittance of the second sight region SR2 for the 45-degree incident ambient beam. When the driving voltage is supplied to the electrically controlled liquid crystal cell 200 (as shown in FIG. 4B), the first sight region SR1 and the second sight region SR2 of the electrically controlled liquid crystal cell 200 have the same average transmittance for the vertically incident ambient beam; the second sight region SR2 and the first sight-sight region SR1 of the electrically controlled liquid crystal cell 200 have the same average transmittance for the 45-degree incident ambient beam; and the average transmittance of the first sight region SR1 of the electrically controlled liquid crystal cell 200 for the vertically incident ambient beam is greater than the average transmittance of the second sight region SR2 for the 45-degree incident ambient beam, and it is greater than or equal to 50%, for example. Here, the vertically incident ambient beam is, for example, the ambient beam incident on the electrically controlled liquid crystal cell 200 in the direction Z, and the 45-degree incident ambient beam is, for example, the ambient beam incident on the electrically controlled liquid crystal cell 200 at a 45-degree angle deviated from the direction Z.

As shown in FIG. 4A and FIG. 5A, the ambient beam incident from each sight region has a first linear polarization P1 after passing through the second polarizing layer POL2. Since the liquid crystal layer 210 is not applied with an electric field, the positive liquid crystal molecules PLC are in a twisted arrangement, and thus the first linear polarization P1 of the ambient beam EB is converted into the second linear polarization P2 after the ambient beam EB passes through the liquid crystal layer 210. Since the direction of electric field polarization of the second linear polarization P2 is perpendicular to the first absorption axis A1 of the first polarizing layer POL1 (as shown in FIG. 2), the ambient beam with the second linear polarization P2 may pass through the first polarizing layer POL1 and be transmitted to the human eye pupil EP, such that the transmittances of the ambient beam are the same (or have a difference less than 5%) at each viewing angle.

As shown in FIG. 4B and FIG. 5B, when the electrically controlled liquid crystal cell 200 is enabled (as a driving voltage is supplied to the electrically controlled liquid crystal cell 200, for example), the percentage of ratio of the average transmittance of the second sight region SR2 for the ambient beam EB2 and the average transmittance of the first sight region SR1 for the ambient beam EB1 is less than or equal to 50%, and the percentage of ratio of the average transmittance of the third sight region SR3 for the ambient beam EB3 and the average transmittance of the first sight region SR1 for the ambient beam EB1 is greater than or equal to 60% (or greater than or equal to 80%).

As shown in FIG. 4B, in this embodiment, when the liquid crystal layer 210 is acted on by an electric field E, the positive liquid crystal molecules PLC tilt to be aligned in the direction of the electric field and form a relatively inclined twisted configuration. At this time, since the ambient beam EB2 incident from the second sight region SR2 receives significantly less phase retardation from the liquid crystal layer 210, and the polarization state of the ambient beam EB2 after passing through the liquid crystal layer 210 does not undergo a substantive change but remains at the first linear polarization P1, the ambient beam EB2 cannot pass through the first polarizing layer POL1. In contrast, since the ambient beam EB1 incident from the first sight region SR1 and the ambient beam EB3 incident from the third sight region SR3 receives relatively more phase retardation from the liquid crystal layer 210, after the ambient beam EB1 and the ambient beam EB3 pass through the liquid crystal layer 210, their polarization state is converted from the first linear polarization P1 to the second linear polarization P2, and thus they are transmitted to the human eye pupil EP after passing through the first polarizing layer POL1.

In other words, when the electrically controlled liquid crystal cell 200 of this embodiment is enabled, the light intensity of the ambient beam EB2 passing through the second sight region SR2 and incident on the human eye pupil EP at different angles is reduced, but the light intensity of the ambient beam EB1 passing through the first sight region SR1 and incident on the human eye pupil EP, and the light intensity of the ambient beam EB3 passing through the third sight region SR3 and incident on the human eye pupil EP, do not change significantly.

For example, in this embodiment, after passing through the optical waveguide 100, the image beams IB emitted by the image beam source 110 leaves the optical waveguide 100 through the first side-view area SV1 and enters the human eye pupil EP. That is to say, the image beam source 110 of this embodiment projects and displays an image in the second sight region SR2 of the electrically controlled liquid crystal cell 200.

As shown in FIG. 6A, when the electrically controlled liquid crystal cell 200 is disabled, it is difficult to see clearly the virtual image (such as the text message shown in the upper right corner in FIG. 6A) projected to the human eye by the image beam source 110 in a real-world scene with high brightness (such as the ceiling light fixture in FIG. 6A), which makes it difficult for the user USR to read the information displayed. In contrast, as shown in FIG. 6B, when the electrically controlled liquid crystal cell 200 is enabled, only the light intensity of the ambient beam EB2 passing through the second sight region SR2 is reduced significantly, such that the display image intended to be presented by the image beam source 110 in the second sight region SR2 may be observed clearly by the user USR even with a bright real-world scene.

Please refer to FIG. 1 and FIG. 3. In this embodiment, the near-eye optical display apparatus 10 optionally includes a half-wave plate 180 disposed on one side of the electrically controlled liquid crystal cell 200 away from the optical waveguide 100 and overlapping the second light incident surface 100is2 of the optical waveguide 100. Preferably, the included angle θ between the axial direction of the slow axis FA of the half-wave plate 180 and the direction X (i.e., the horizontal line of sight of the user USR) is 22.5 degrees or 67.5 degrees, increasing the anti-glare effect of the near-eye optical display apparatus 10.

Other embodiments are listed below to describe the present disclosure in detail, wherein the same components will be marked with the same referential numbers. The description of components with the same referential numbers is omitted hereinafter. Please refer to the foregoing embodiments for the omitted parts, and will not repeated herein.

Figure 8:
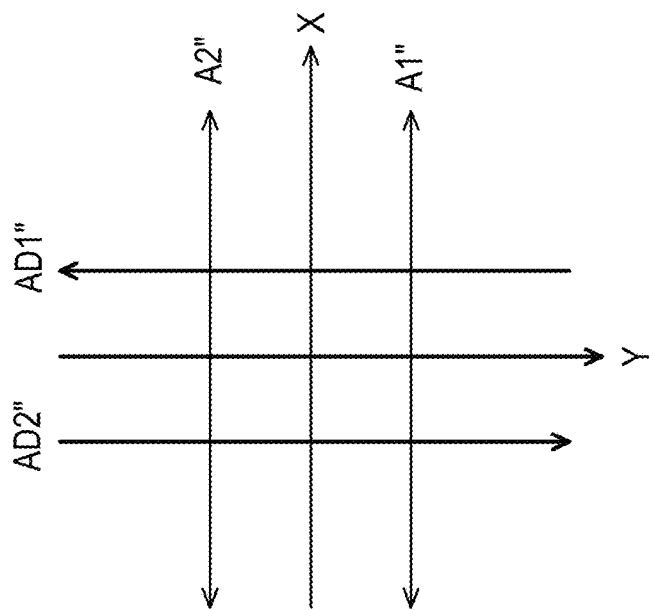
FIG. 8 is a schematic diagram showing the relationship between the axial direction of the absorption axis of the polarizing layer and the alignment direction of the alignment layer in FIG. 7.
Figure 7:
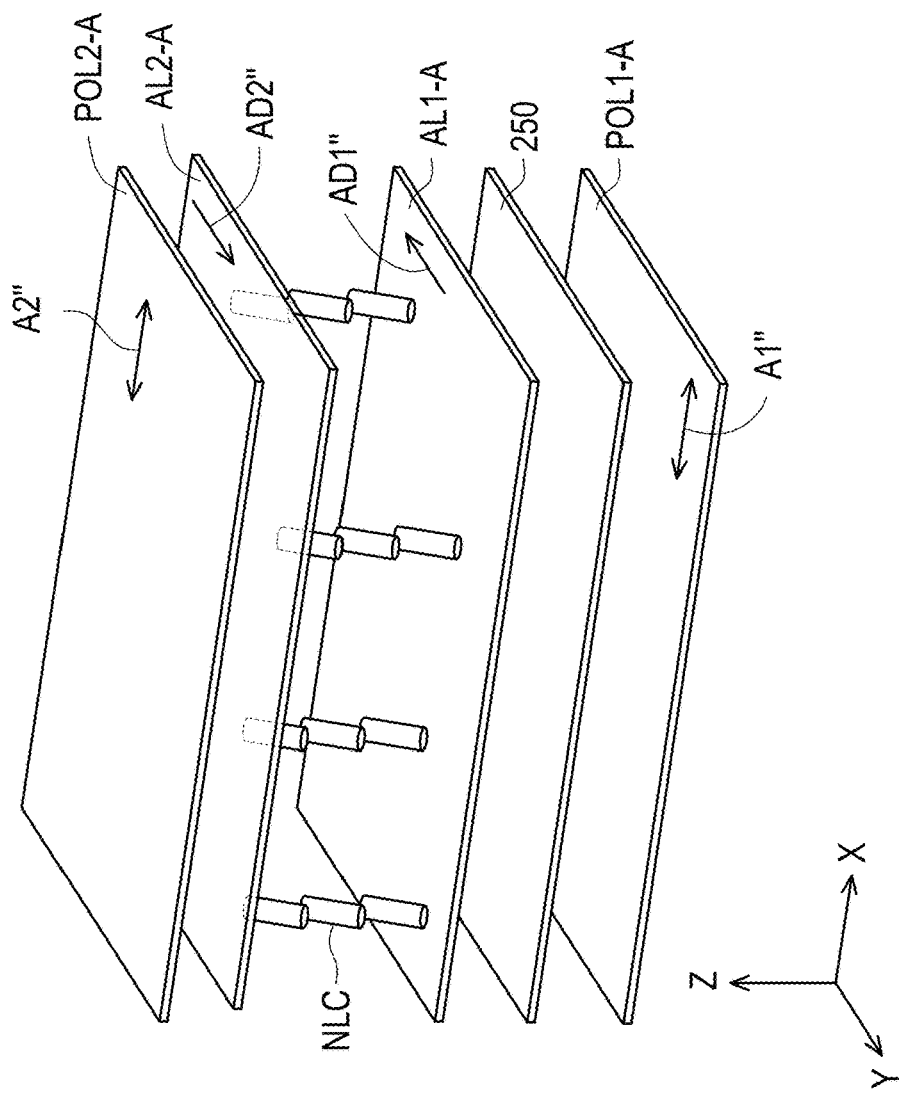
FIG. 7 is a schematic diagram of part of the film layers of the electrically controlled liquid crystal cell according to the second embodiment of the invention.
Figure 9A:
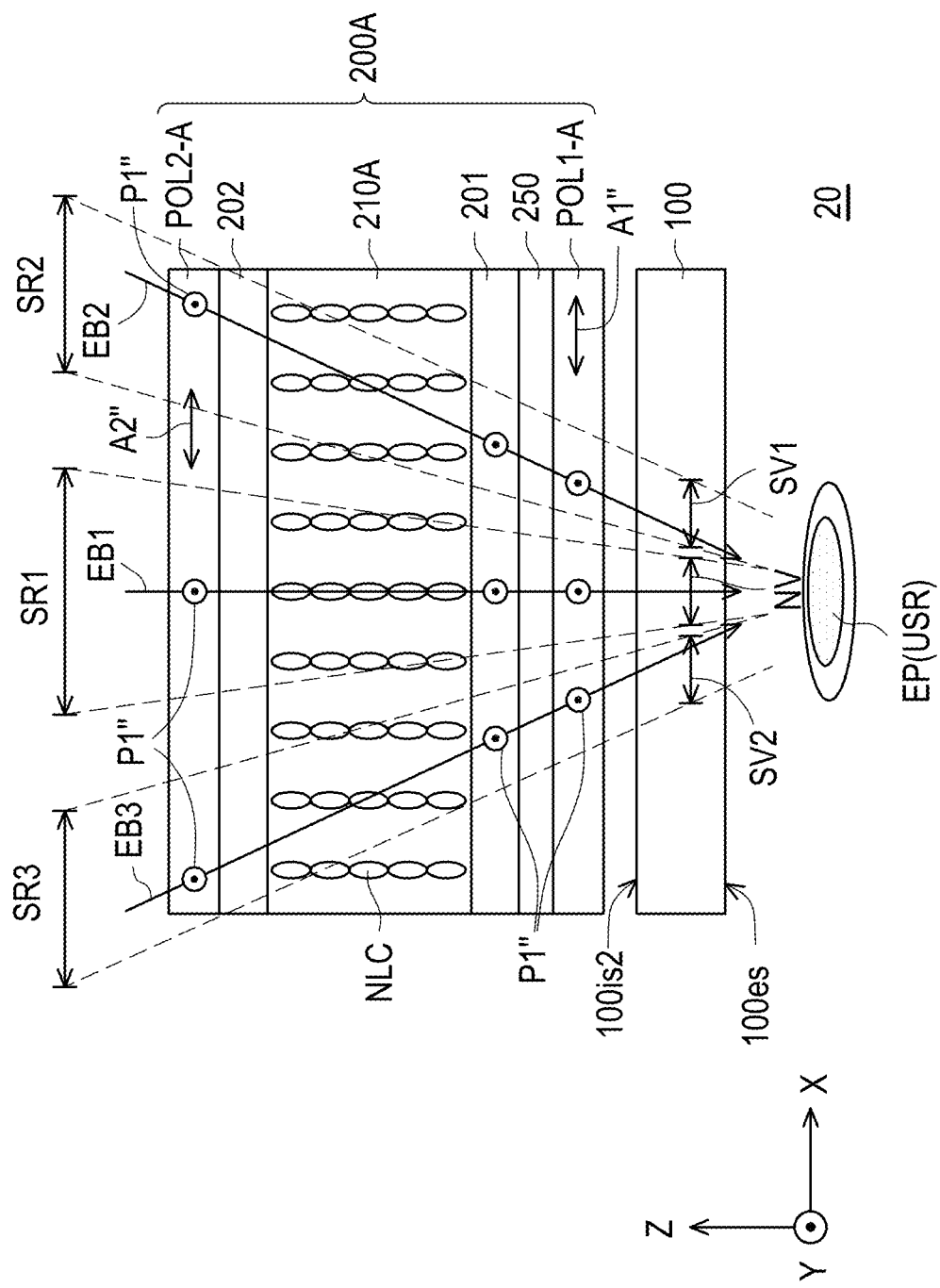
FIG. 9A is a schematic side view of the near-eye optical display apparatus using the electrically controlled liquid crystal cell in FIG. 7 when the electrically controlled liquid crystal cell is disabled.
Figure 9B:
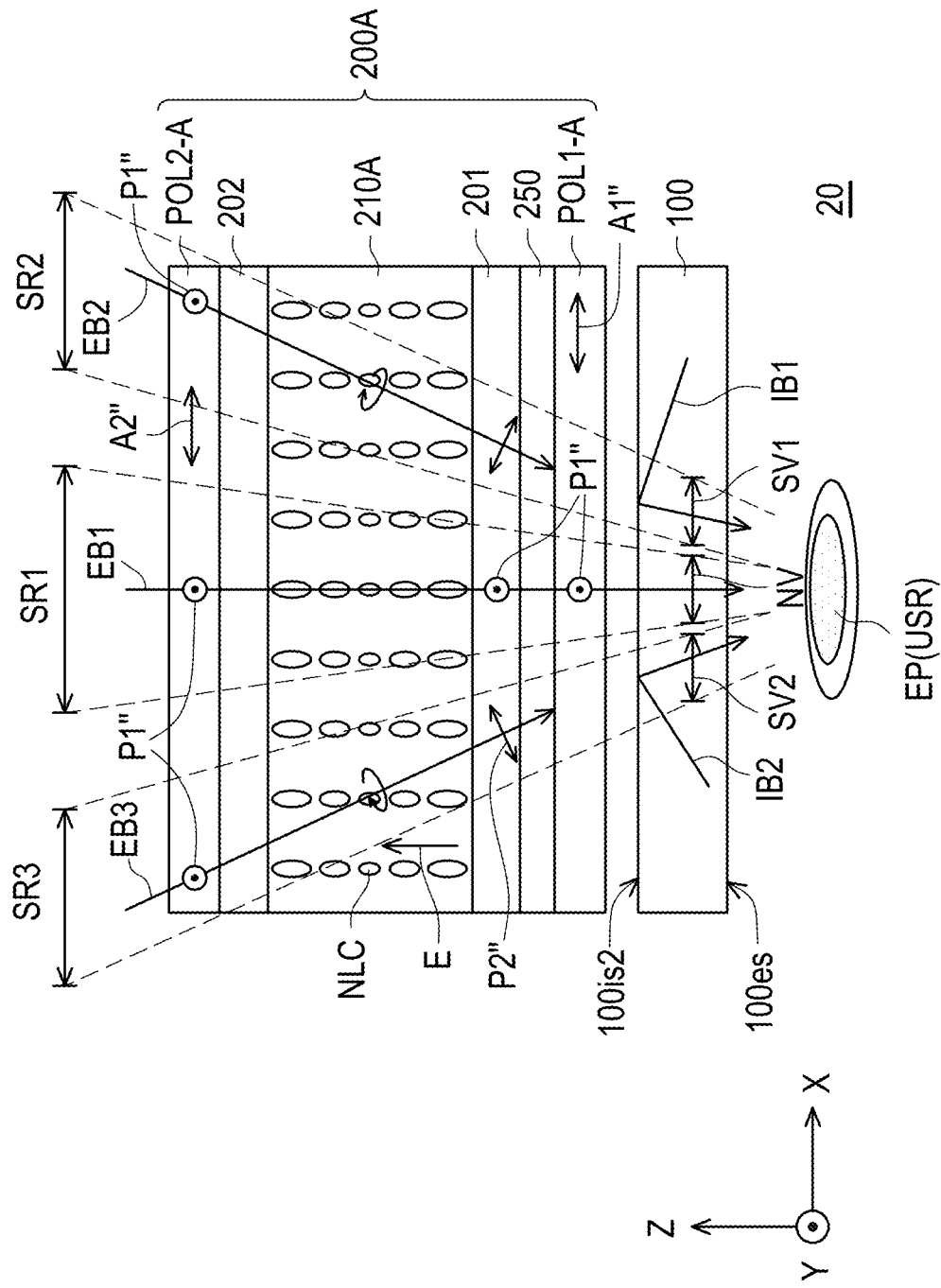
FIG. 9B is a schematic side view of the near-eye optical display apparatus using the electrically controlled liquid crystal cell in FIG. 7 when the electrically controlled liquid crystal cell is enabled.
Figures 10A, 10B:
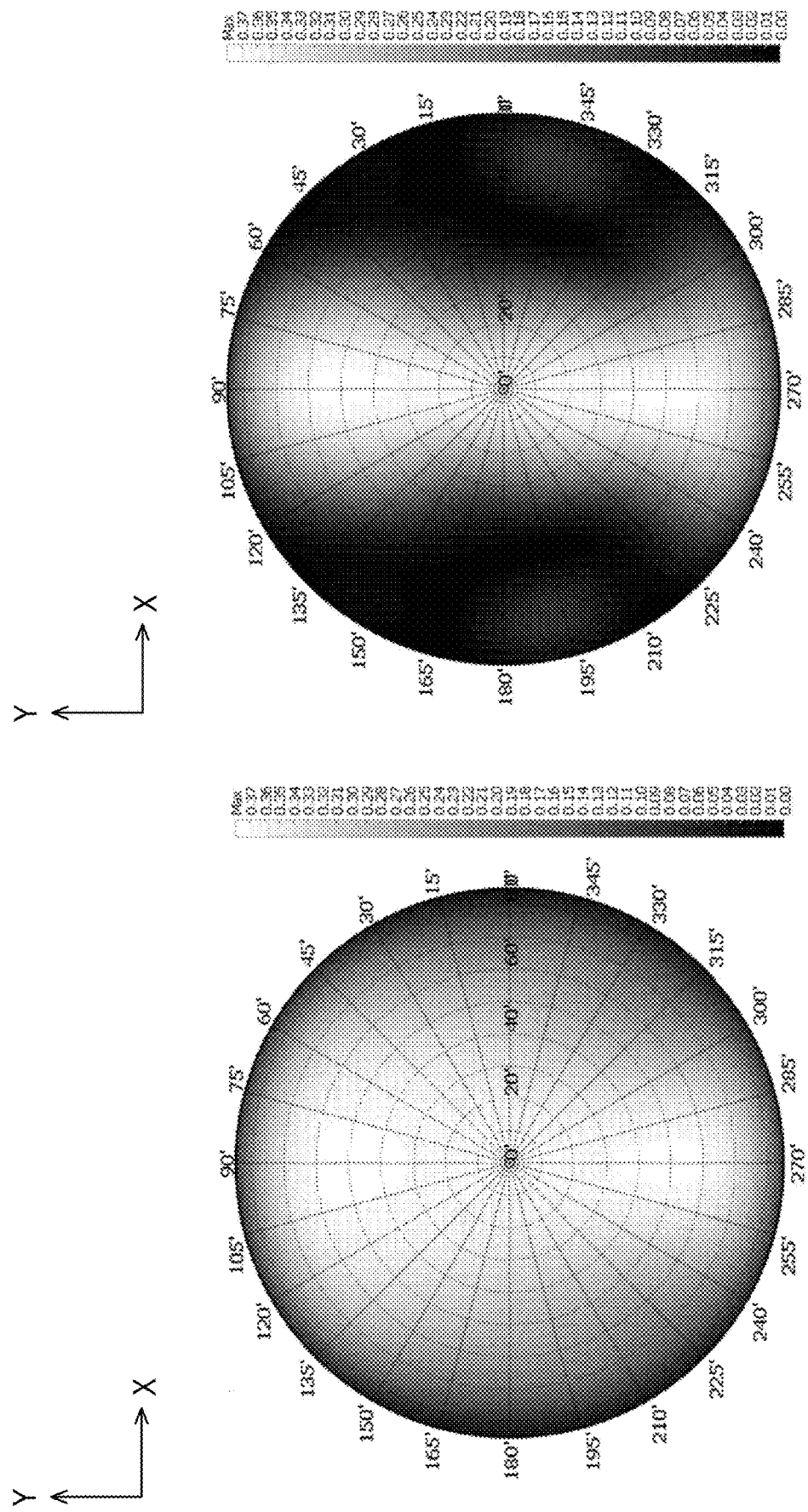
FIG. 10A is a transmittance distribution diagram of the near-eye optical display apparatus in FIG. 9A.
FIG. 10B is a transmittance distribution diagram of the near-eye optical display apparatus in FIG. 9B.
Figure 11A:
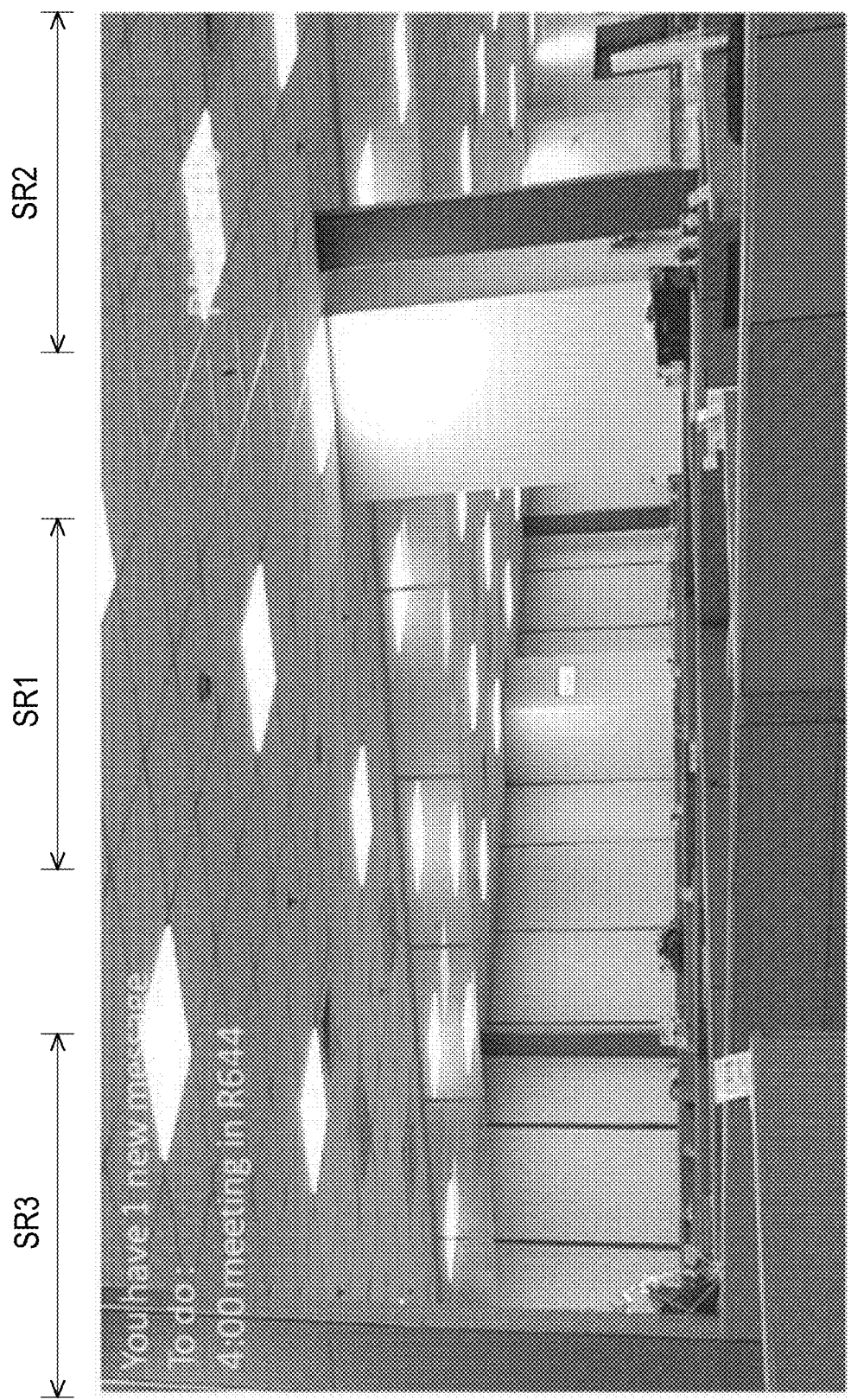
FIG. 11A is a schematic diagram of the superposition of the scene and the displayed image seen by the human eye pupil from the near-eye optical display apparatus in FIG. 9A.
Figure 11B:
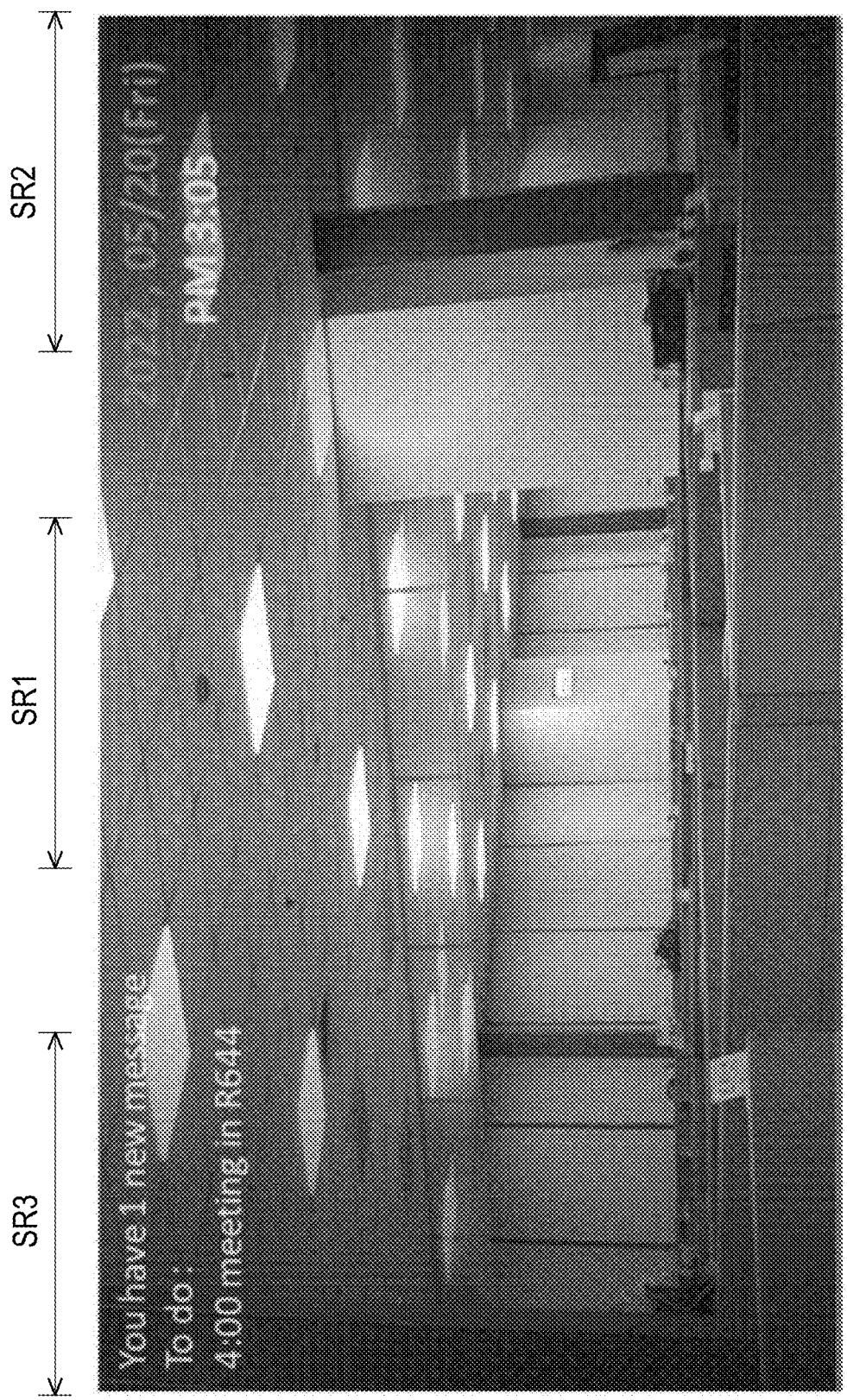
FIG. 11B is a schematic diagram of the superposition of the scene and the displayed image seen by the human eye pupil from the near-eye optical display apparatus in FIG. 9B.

FIG. 7 is a schematic diagram of part of the film layers of the electrically controlled liquid crystal cell according to the second embodiment of the invention. FIG. 8 is a schematic diagram showing the relationship between the axial direction of the absorption axis of the polarizing layer and the alignment direction of the alignment layer in FIG. 7. FIG. 9A is a schematic side view of the near-eye optical display apparatus using the electrically controlled liquid crystal cell in FIG. 7 when the electrically controlled liquid crystal cell is disabled. FIG. 9B is a schematic side view of the near-eye optical display apparatus using the electrically controlled liquid crystal cell in FIG. 7 when the electrically controlled liquid crystal cell is enabled. FIG. 10A is a transmittance distribution diagram of the near-eye optical display apparatus in FIG. 9A. FIG. 10B is a transmittance distribution diagram of the near-eye optical display apparatus in FIG. 9B. FIG. 11A is a schematic diagram of the superposition of the scene and the displayed image seen by the human eye pupil from the near-eye optical display apparatus in FIG. 9A. FIG. 11B is a schematic diagram of the superposition of the scene and the displayed image seen by the human eye pupil from the near-eye optical display apparatus in FIG. 9B.

Please refer to FIG. 7, FIG. 8 and FIG. 9A. The main differences between the near-eye optical display apparatus 20 of this embodiment and the near-eye optical display apparatus 10 in FIG. 4A are the configuration of the electrically controlled liquid crystal cell and the light modulation. In this embodiment, the first alignment direction AD1" of the first alignment layer AL1-A of the electrically controlled liquid crystal cell 200A is antiparallel to the second alignment direction AD2" of the second alignment layer AL2-A, and the first absorption axis A1" of the first polarizing layer POL1-A is parallel to the second absorption axis A2" of the second polarizing layer POL2-A, but the disclosure is not limited thereto. In another modified embodiment, the first alignment direction AD1" of the first alignment layer AL1-A may also be parallel to the second alignment direction AD2" of the second alignment layer AL2-A.

In this embodiment, the first alignment direction AD1" of the first alignment layer AL1-A and the second alignment direction AD2" of the second alignment layer AL2-A are both perpendicular to the direction X (that is, the horizontal line of sight of the user), and the first absorption axis A1" of the first polarizing layer POL1-A and the second absorption axis A2" of the second polarizing layer POL2-A are both parallel to the direction X. For example, the first alignment direction AD1" is defined by the direction X deflected 90 degrees counter-clockwise with the direction Z as the center, and the second alignment direction AD2" is defined by the direction X deflected 90 degrees clockwise with the direction Z as the center (as shown in FIG. 7 and FIG. 8). In other words, the liquid crystal layer 210A of this embodiment is driven by the mechanism of vertical alignment (VA).

Furthermore, the electrically controlled liquid crystal cell 200A may optionally include a phase retardation layer 250 disposed between the first polarizing layer POL1-A and the second polarizing layer POL2-A. For example, in this embodiment, the phase retardation layer 250 is disposed between the first substrate 201 and the first polarizing layer POL1-A, but the disclosure is not limited thereto. In another embodiment not shown, the phase retardation layer 250 may also be disposed between the second substrate 202 and the second polarizing layer POL2-A. Preferably, the phase retardation in the thickness direction of the phase retardation layer 250 is between 200 nm and 400 nm.

Please refer to FIG. 9A and FIG. 10A. When the electrically controlled liquid crystal cell 200A is disabled (for example, no driving voltage is supplied to the electrically controlled liquid crystal cell), the first sight region SR1 (the area where the viewing angle range is between −30 degrees and 30 degrees in the direction X), the second sight region SR2 (the area where the viewing angle range is greater than 35 degrees in the direction X), and the third sight region SR3 (the area where the viewing angle range is less than −35 degrees in the direction X) have approximately the same average transmittances respectively for the ambient beam EB1, the ambient beam EB2, and the ambient beam EB3 (as shown in FIG. 10A). The difference in the average transmittance of each of these sight regions is within 5% for the ambient beam EB, for example. The average transmittance here is, for example, the average transmittance of the sight regions of the electrically controlled liquid crystal cell 200A for multiple ambient beams EB that pass through the sight region and enter the human eye pupil EP at different angles (for example, each angle within the viewing angle range that corresponds to the sight regions).

As shown in FIG. 9A, the ambient beam incident from each sight region has a first linear polarization P1" after passing through the second polarizing layer POL2-A. Since the liquid crystal layer 210A is not applied with an electric field, the negative liquid crystal molecules NLC are aligned vertically. After the ambient beam EB1, the ambient beam EB2, and the ambient beam EB3 pass through the liquid crystal layer 210A, their respective polarization states still remain at the first linear polarization P1". Since the direction of electric field polarization of the first linear polarization P1" is perpendicular to the first absorption axis A1" of the first polarizing layer POL1-A, the ambient beam with the first linear polarization P1" may pass through the first polarizing layer POL1-A and be transmitted to the human eye pupil EP.

Please refer to FIG. 9B and FIG. 10B. When the electrically controlled liquid crystal cell 200A is enabled (as a driving voltage is supplied to the electrically controlled liquid crystal cell 200A, for example), the percentage of ratio of the average transmittance of the second sight region SR2 for the ambient beam EB2 and the average transmittance of the first sight region SR1 for the ambient beam EB1 is less than or equal to 50%, and the percentage of ratio of the average transmittance of the third sight region SR3 for the ambient beam EB3 and the average transmittance of the first sight region SR1 for the ambient beam EB1 is less than or equal to 50%. The first sight region SR1 and the second sight region SR2 of the electrically controlled liquid crystal cell 200A have the same average transmittance for the vertically incident ambient beam, and the second sight region SR2 of the electrically controlled liquid crystal cell 200A and the first sight-sight region SR1 have the same average transmittance for a 45-degree incident ambient beam. The average transmittance of the first sight region SR1 of the electrically controlled liquid crystal cell 200A for the vertically incident ambient beam is greater than the average transmittance of the second sight region SR2 for the 45-degree incident ambient beam, and it is greater than or equal to 50%, for example.

As shown in FIG. 9B, in this embodiment, when the liquid crystal layer 210A is acted on by the electric field E, the farther away from the alignment layer, the negative liquid crystal molecules NLC tilt to be aligned in the direction perpendicular to the electric field. At this time, since the ambient beam EB1 incident from the first sight region SR1 receives significantly less phase retardation from the liquid crystal layer 210A, and the polarization state of the ambient beam EB1 after passing through the liquid crystal layer 210A does not undergo a substantive change but remains at the first linear polarization P1", the ambient beam EB1 can pass through the first polarizing layer POL1-A. In contrast, the ambient beam EB2 incident from the second sight region SR2 and the ambient beam EB3 incident from the third sight region SR3 receive relatively more phase retardation from the liquid crystal layer 210A, after the ambient beam EB2 and the ambient beam EB3 pass through the liquid crystal layer 210A, their polarization states may be converted from the first linear polarization P1" to the second linear polarization P2". As the direction of electric field polarization of the second linear polarization P2" is parallel to the first absorption axis A1" of the first polarizer POL1-A, the ambient beam EB2 and the ambient beam EB3 with the second linear polarization P2" are to be absorbed by and cannot pass through the first polarizing layer POL1-A.

That is to say, when the electrically controlled liquid crystal cell 200A of this embodiment is enabled, the light intensity of the ambient beams EB2 and EB3 passing through the second sight region SR2 and the third sight region SR3 and incident at different angles may be reduced, but the light intensity of the ambient beam EB1 passing through the first sight region SR1 does not undergo significant change.

For example, in this embodiment, the image beam IB1 and the image beam IB2 from the image beam source (as shown in FIG. 1) leave the optical waveguide respectively through the first side-view area SV1 and the second side-view area SV2 of the light-exit surface 100es after being transmitted through the optical waveguide 100 and enter the human eye pupil EP. In other words, the image beam source of this embodiment projects and display images in the second sight region SR2 and the third sight region SR3 of the electrically controlled liquid crystal cell 200A.

As shown in FIG. 11A, when the electrically controlled liquid crystal cell 200A is disabled, it is difficult to see clearly the virtual image (such as the text messages in the upper left and upper right corners in FIG. 11A) projected to the human eye by an image beam source with a real-world scene with high brightness (such as the ceiling light fixture in FIG. 11A), which makes it difficult for the user USR to read the information displayed. In contrast, as shown in FIG. 11B, when the electrically controlled liquid crystal cell 200A is enabled, the light intensity of the ambient beam EB2 passing through the second sight region SR2 and the ambient beam EB3 passing through the third sight region SR3 are reduced significantly, such that the display image intended to be presented by the image beam source in the second sight region SR2 and the third sight region SR3 may be observed clearly by the user USR even with a bright real-world background.

Note that if the liquid crystal layer 210A of this embodiment is of positive liquid crystals, it would have poorer effect in reducing the intensity of ambient beam. The first sight region, the second sight region, and the third sight region of the invention are not limited to being disposed along the horizontal line of sight of the user USR, as each sight region may also be disposed along the vertical line of sight (i.e., the Y direction) of the user USR.

Figure 13:
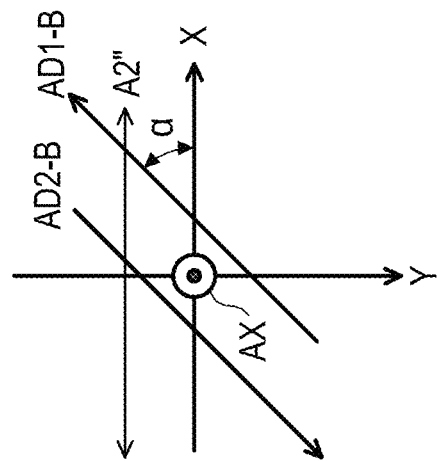
FIG. 13 is a schematic diagram showing the relationship between the axial direction of the absorption axis of the polarizing layer and the alignment direction of the alignment layer in FIG. 12.
Figure 12:
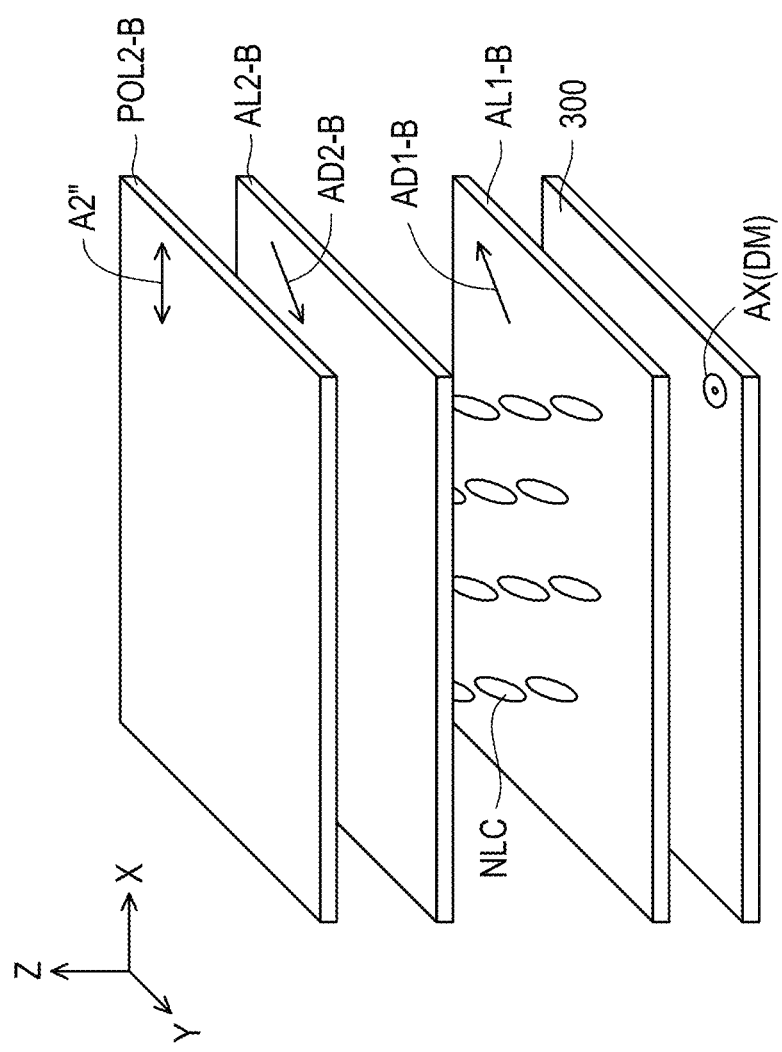
FIG. 12 is a schematic diagram of part of the film layers of the electrically controlled liquid crystal cell according to the third embodiment of the invention.
Figure 14A:
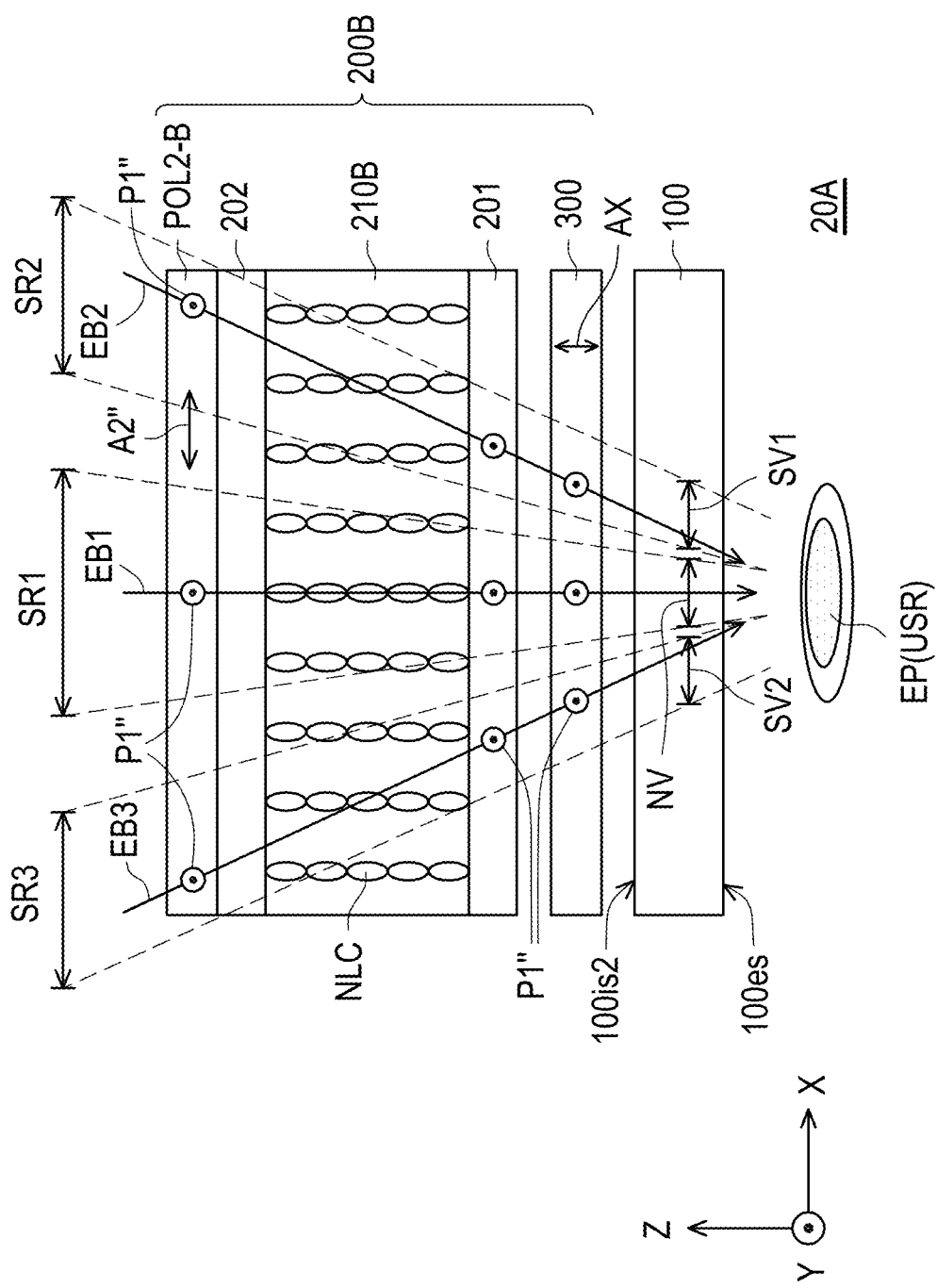
FIG. 14A and FIG. 14B are schematic side views of the near-eye optical display apparatus using the electrically controlled liquid crystal cell in FIG. 12 when the electrically controlled liquid crystal cell is disabled.
Figure 14B:
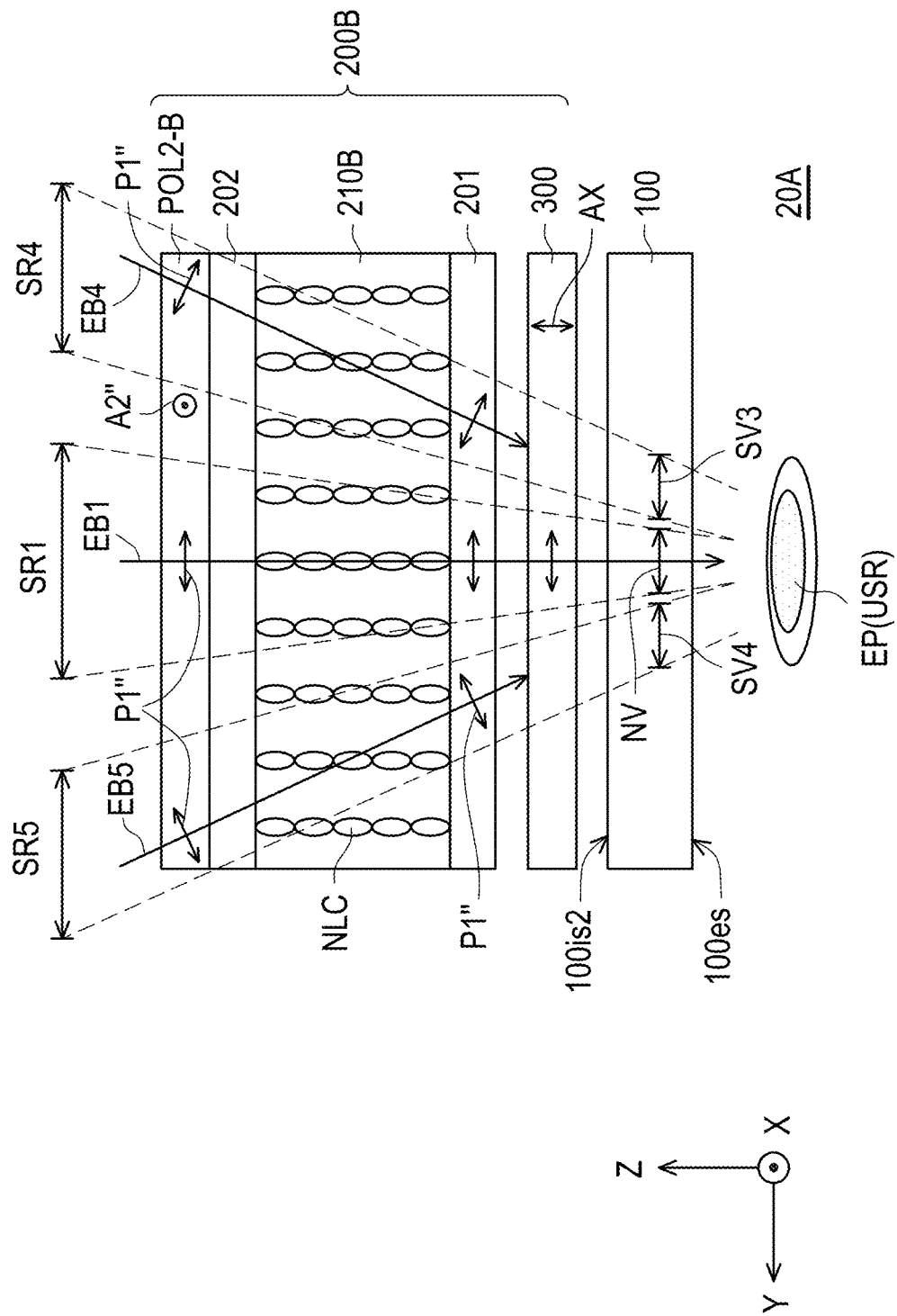
Figure 15A:
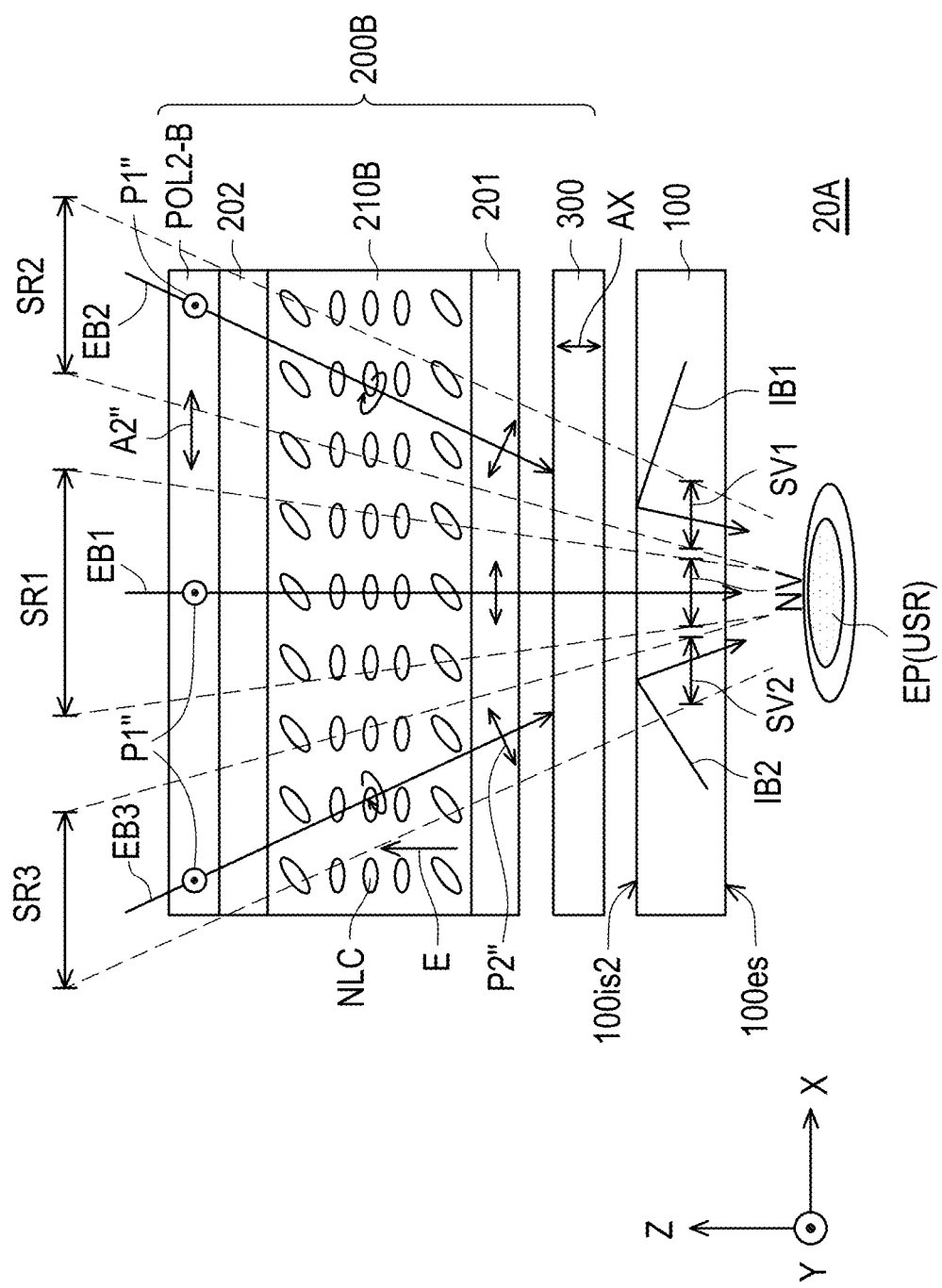
FIG. 15A and FIG. 15B are schematic side views of the near-eye optical display apparatus using the electrically controlled liquid crystal cell in FIG. 12 when the electrically controlled liquid crystal cell is enabled.
Figure 15B:
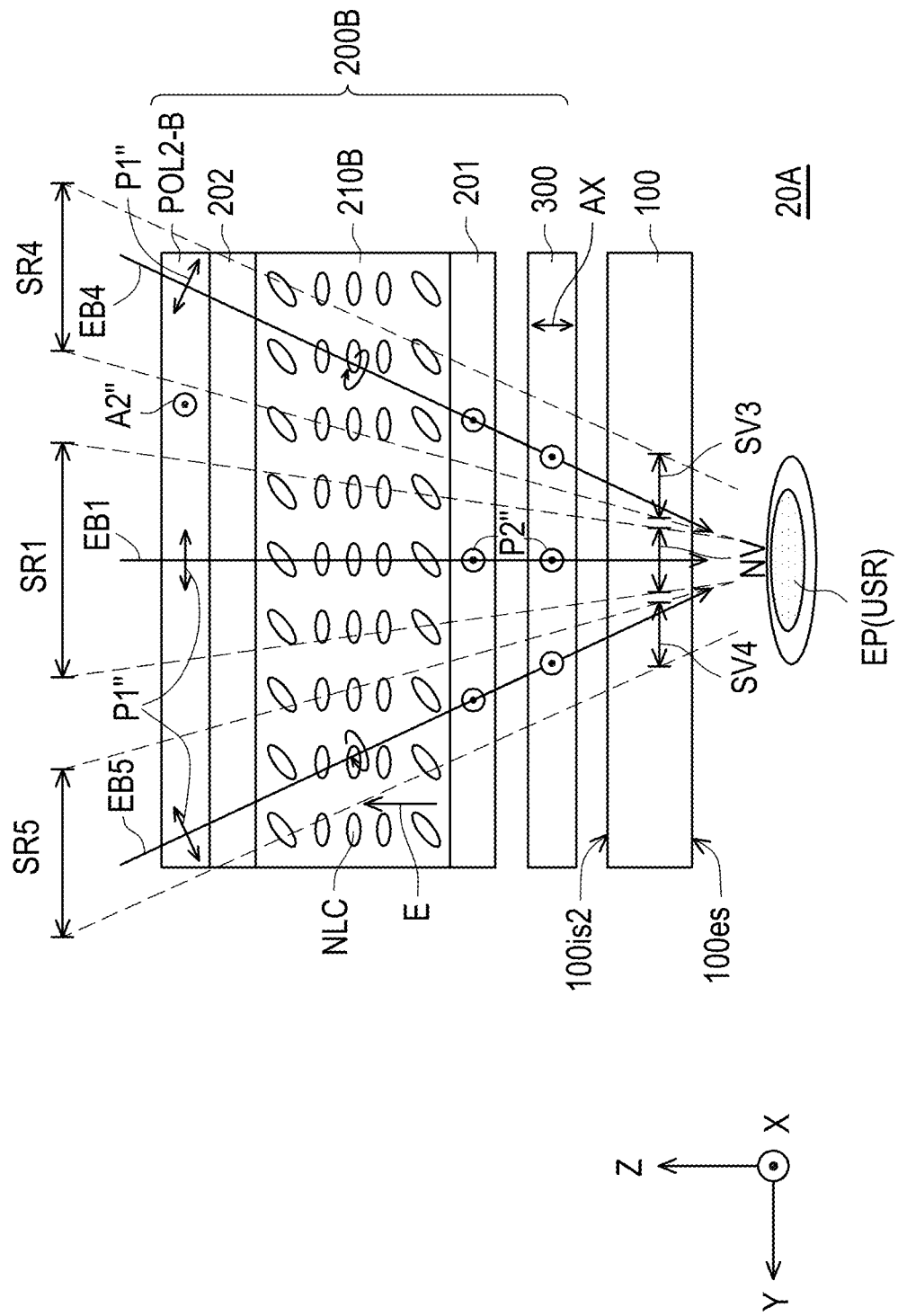
Figure 16:
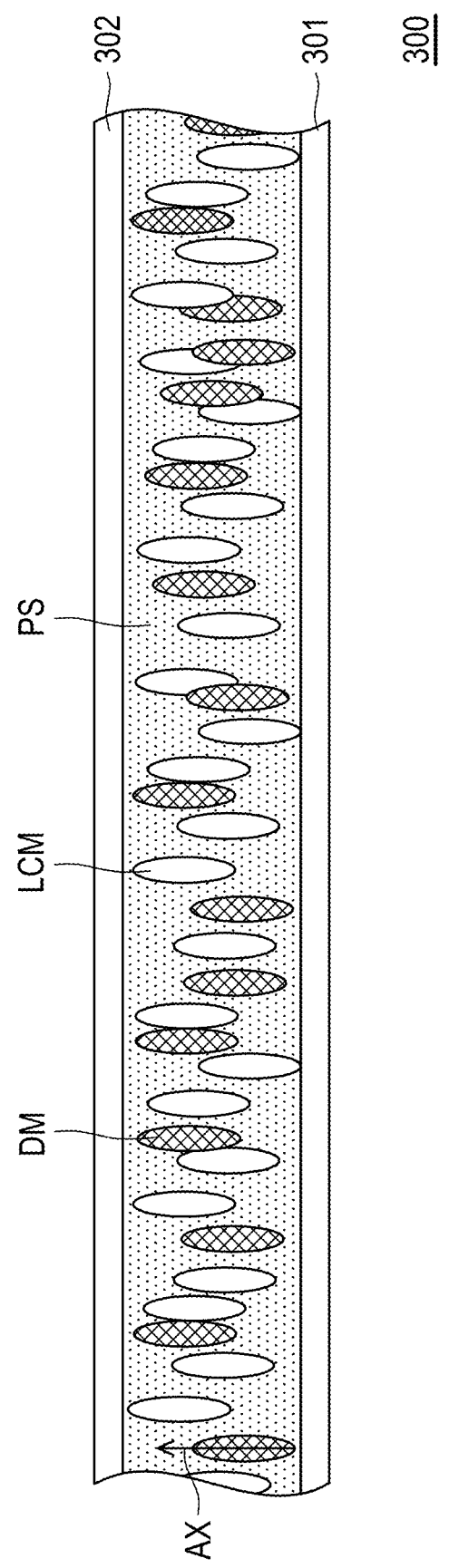
FIG. 16 is a cross-sectional view of the viewing angle limiting device in FIG. 12.
Figures 17A, 17B:
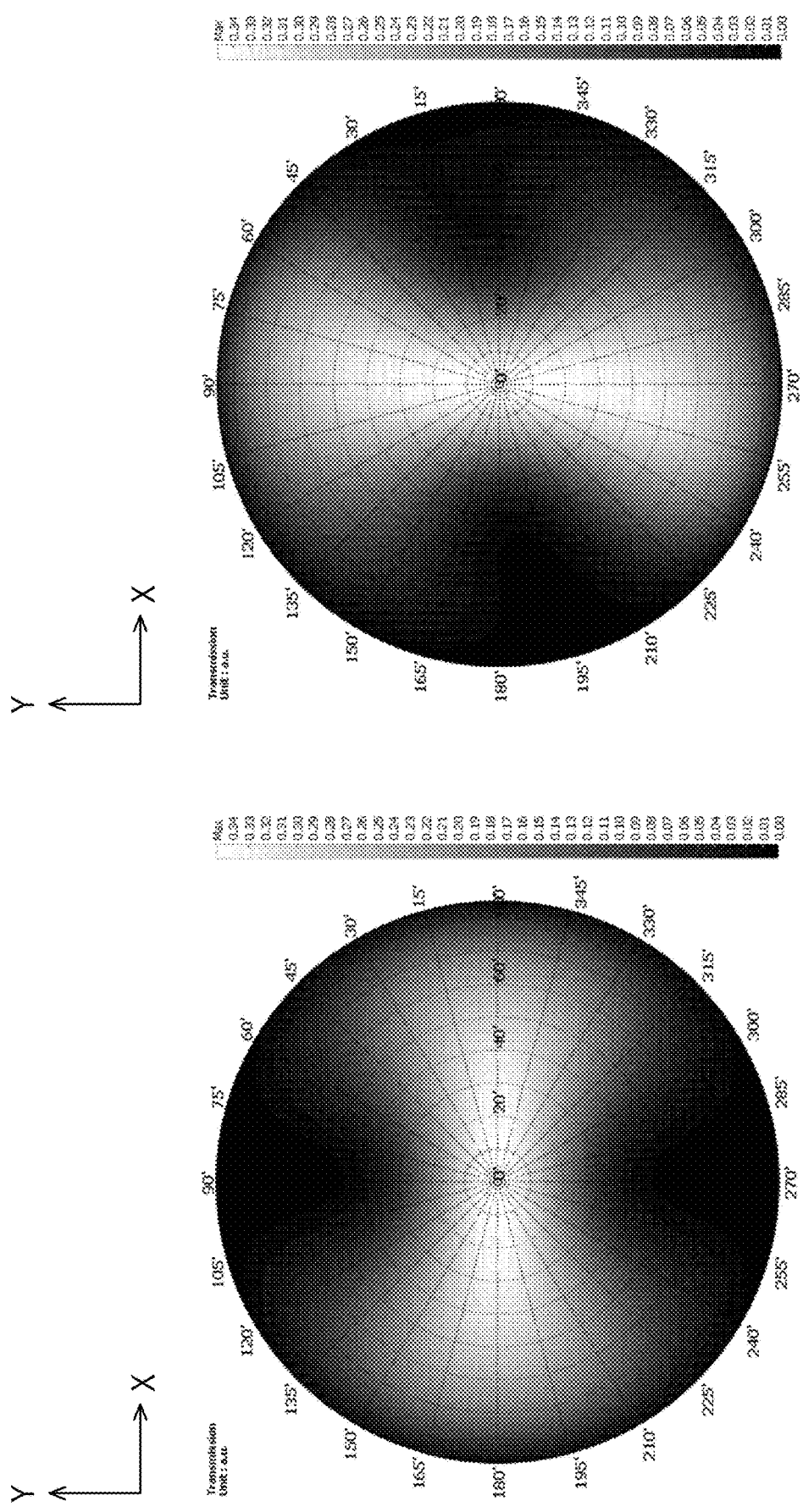
FIG. 17A is a transmittance distribution diagram of the near-eye optical display apparatus using the electrically controlled liquid crystal cell in FIG. 12 when the electrically controlled liquid crystal cell is disabled.
FIG. 17B is a transmittance distribution diagram of the near-eye optical display apparatus using the electrically controlled liquid crystal cell in FIG. 12 when the electrically controlled liquid crystal cell is enabled.

FIG. 12 is a schematic diagram of part of the film layers of the electrically controlled liquid crystal cell according to the third embodiment of the invention. FIG. 13 is a schematic diagram showing the relationship between the axial direction of the absorption axis of the polarizing layer and the alignment direction of the alignment layer in FIG. 12. FIG. 14A and FIG. 14B are schematic side views of the near-eye optical display apparatus using the electrically controlled liquid crystal cell in FIG. 12 when the electrically controlled liquid crystal cell is disabled. FIG. 15A and FIG. 15B are schematic side views of the near-eye optical display apparatus using the electrically controlled liquid crystal cell in FIG. 12 when the electrically controlled liquid crystal cell is enabled. FIG. 16 is a cross-sectional view of the viewing angle limiting device in FIG. 12. FIG. 17A is a transmittance distribution diagram of the near-eye optical display apparatus using the electrically controlled liquid crystal cell in FIG. 12 when the electrically controlled liquid crystal cell is disabled. FIG. 17B is a transmittance distribution diagram of the near-eye optical display apparatus using the electrically controlled liquid crystal cell in FIG. 12 when the electrically controlled liquid crystal cell is enabled.

Please refer to FIG. 12, FIG. 13, and FIG. 14. The main differences between the electrically controlled liquid crystal cell 200B of this embodiment and the electrically controlled liquid crystal cell 200A in FIG. 9A are the alignment direction of the liquid crystal layer and the configuration of the electrically controlled liquid crystal cell. Specifically, in this embodiment, the first alignment direction AD1-B of the first alignment layer AL1-B is antiparallel to the second alignment direction AD2-B of the second alignment layer AL2-B, and the included angle α between the first alignment direction AD1-B of the first alignment layer AL1-B and the second absorption axis A2" of the second polarizing layer POL2-B is 45 degrees. For example, the first alignment direction AD1-B is defined by the direction X deflected 45 degrees counter-clockwise with the direction Z as the center, and the second alignment direction AD2-B is defined by the direction X deflected 135 degrees clockwise with the direction Z as the center.

In this embodiment, the electrically controlled liquid crystal cell 200B further includes a viewing angle limiting device 300, which is configured to replace the first polarizing layer POL1-A and the phase retardation layer 250 (i.e. the electrically controlled liquid crystal cell 200B does not include the first polarizing layer POL1-A and the phase retardation layer 250) of the electrically controlled liquid crystal cell 200A in FIG. 9A. For example, as shown in FIG. 16, the viewing angle limiting device 300 includes a polymer substrate PS, a plurality of dye molecules DM and a plurality of liquid crystal molecules LCM. The dye molecules DM are dispersedly arranged in the polymer substrate PS. The dye molecules DM dispersed among the liquid crystal molecules LCM are affected by the liquid crystal molecules LCM under, for example, a guest-host effect, and a molecular long axis thereof tends to be parallel to the optical axes n of the liquid crystal molecules LCM.

It should be noted that the dye molecules DM have a first absorption coefficient in a thickness direction of the polymer substrate PS, and have a second absorption coefficient in a direction perpendicular to the thickness direction of the polymer substrate PS. A ratio of the first absorption coefficient to the second absorption coefficient is between 10 and 1000. The thickness direction herein may be a normal direction of the substrate surface of the polymer substrate PS (i.e. the vertical direction in FIG. 16 or the direction Z in FIG. 12). Namely, the dye molecules DM has an absorption axis AX, and an axial direction of the absorption axis AX is perpendicular to the substrate surface of the polymer substrate PS. From another point of view, the axial direction of the absorption axis AX of the dye molecules DM of the viewing angle limiting device 300 is perpendicular to the second absorption axis A2" of the second polarizing layer POL2-B, the first alignment direction AD1-B of the first alignment layer AL1-B, and the second alignment direction AD2-B of the second alignment layer AL2-B. For example, the polymer substrate PS may be a cured material, so the axial direction of the absorption axis AX of the dye molecules DM dispersed in the polymer substrate PS are fixed and will not changed with the electric field.

In the embodiment, a material of the dye molecules DM may include an Azo type compound or an anthraquinone type compound. A material of the liquid crystal molecules LCM may include a nematic liquid crystal material, a smectic liquid crystal material or a discotic liquid crystal material. However, the invention is not limited thereto. According to other embodiments, the liquid crystal molecules may also be materials with chemical functional groups like a dichroic dye structure. Namely, in the embodiment, the viewing angle limiting device may not have the dye molecules DM.

In this embodiment, the viewing angle limiting device 300 may further include a protective layer 301 and a protective layer 302, respectively covering two opposite substrate surfaces of the polymer substrate PS. The protective layer 301 and the protective layer 302 each may be a hard coat, a low-refection film, an anti-reflection film, an anti-smudge film, an anti-fingerprint film, an anti-glare film, an anti-scratch film, or a composite film layer of the above films, but the invention is not limited thereto. In another embodiment not shown, a support substrate may be adopted to replace one of the protective layers disposed on one substrate surface of the polymer substrate PS.

Please refer to FIG. 14A and FIG. 14B, the sight region of the near-eye optical display apparatus 20A may be defined by the display area on the light-exit surface 100es of the optical waveguide 100. For example, the middle block (i.e. the normal view area NV) of the display area is defined as the first sight region SR1, the two side blocks (i.e. the first side-view area SV1 and the second side-view area SV2) respectively on opposite sides of the middle block in the display area along the direction X are respectively defined as the second sight region SR2 and the third sight region SR3, and the two side blocks (i.e. the third side-view area SV3 and the fourth side-view area SV4) respectively on opposite sides of the middle block in the display area along the direction Y are respectively defined as the fourth sight region SR4 and the fifth sight region SR5.

More specifically, in the direction of the line of sight of the user USR, the normal view area NV, the first side-view area SV1, the second side-view area SV2, the third side-view area SV3 and the fourth side-view area SV4 of the light-exit surface 100es respectively overlap the first sight region SR1, the second sight region SR2, the third sight region SR3, the fourth sight region SR4 and the fifth sight region SR5. The two side blocks in the display area of the light-exit surface 100es may exhibit symmetrical distribution or asymmetric distribution relative to the middle block, and the area of each block may be the same with or different from each other.

When the electrically controlled liquid crystal cell 200B is disabled (for example, no driving voltage is supplied to the electrically controlled liquid crystal cell 200B), the first sight region SR1 (the area where the viewing angle range is between −30 degrees and 30 degrees in the direction X), the second sight region SR2 (the area where the viewing angle range is greater than 35 degrees in the direction X), and the third sight region SR3 (the area where the viewing angle range is less than −35 degrees in the direction X) have roughly the same average transmittance respectively for the ambient beam EB1, the ambient beam EB2, and the ambient beam EB3 (as shown in FIG. 17A). The difference in the average transmittance of each of these sight regions is within 5% for the ambient beam EB, for example. The average transmittance here is, for example, the average transmittance of the sight regions of the electrically controlled liquid crystal cell 200B for multiple ambient beams EB that pass through the sight region and enter the human eye pupil EP at different angles (for example, each angle within the viewing angle range that correspond to the sight region).

As shown in FIG. 14A, the ambient beam incident from each sight region has a first linear polarization P1 after passing through the second polarizing layer POL2-B. Since the liquid crystal layer 210B is not applied with an electric field, the negative liquid crystal molecules NLC are in vertical arrangement. After the ambient beam EB1, the ambient beam EB2, and the ambient beam EB3 pass through the liquid crystal layer 210B, their respective polarization states still remain at the first linear polarization P1". Since the direction of electric field polarization of the first linear polarization P1" is perpendicular to the absorption axis AX of the viewing angle limiting device 300, the ambient beam with the first linear polarization P1" may pass through the viewing angle limiting device 300 and be transmitted to the human eye pupil EP.

However, when the electrically controlled liquid crystal cell 200B is disabled, the first sight region SR1 (the area where the viewing angle range is between −30 degrees and 30 degrees in the direction Y), the fourth sight region SR4 (the area where the viewing angle ragnge is greater than 35 degrees in the direction Y) and the fifth sight region SR5 (the area where the viewing angle range is less than −35 degrees in the direction Y) have different average transmittances respectively for the ambient beam EB1, the ambient beam EB4 and the ambient beam EB5 (as shown in FIG. 14B).

For example, the percentage of ratio of the average transmittance of the fourth sight region SR4 for the ambient beam EB4 and the average transmittance of the first sight region SR1 for the ambient beam EB1 is less than or equal to 50%, and the percentage of ratio of the average transmittance of the fifth sight region SR5 for the ambient beam EB5 and the average transmittance of the first sight region SR1 for the ambient beam EB1 is less than or equal to 50%. In other words, when the electrically controlled liquid crystal cell 200B of this embodiment is disabled, the light intensity of the ambient beam EB4 and the ambient beam EB5 incident at different angles and along the YZ plane is reduced, but the light intensity of the ambient beam EB2 and the ambient beam EB3 incident at different angles and along the XZ plane do not change significantly (as shown in FIG. 17A).

Please refer to FIG. 15A, FIG. 15B and FIG. 17B. When the electrically controlled liquid crystal cell 200B is enabled (i.e. the liquid crystal layer 210B is acted on by an electric field E), the farther away from the alignment layer, the negative liquid crystal molecules NLC tilt to be aligned in the direction perpendicular to the electric field. At this time, since the ambient beam EB1 incident from the first sight region SR1, the ambient beam EB2 incident from the second sight region SR2 and the ambient beam EB3 incident from the third sight region SR3 receive significantly more phase retardation from the liquid crystal layer 210B, the polarization states of the ambient beam EB1, the ambient beam EB2 and the ambient beam EB3 after passing through the liquid crystal layer 210B are converted from the first linear polarization P1" to the second linear polarization P2".

Since the ambient beam EB1 is perpendicular to the viewing angle limiting device 300 and the polarizing direction of its electric field is perpendicular to the absorption axis AX of the viewing angle limiting device 300, the viewing angle limiting device 300 does not substantially absorb the ambient beam EB1. However, the polarizing direction of electric field of the second linear polarization P2" of each of the ambient beam EB2 and the ambient beam EB3 incident on the viewing angle limiting device 300 at a side viewing angle and along the XZ plane has a component parallel to the absorption axis AX of the viewing angle limiting device 300. The ambient beam EB2 and the ambient EB3 are absorbed by the viewing angle limiting device 300 and cannot pass through.

For example, when the electrically controlled liquid crystal cell 200B is enabled, the percentage of ratio of the average transmittance of the second sight region SR2 for the ambient beam EB2 and the average transmittance of the first sight region SR1 for the ambient beam EB1 is less than or equal to 50%, and the percentage of ratio of the average transmittance of the third sight region SR3 for the ambient beam EB3 and the average transmittance of the first sight region SR1 for the ambient beam EB1 is less than or equal to 50%.

On the other hand, since the polarizing direction of electric field of the second linear polarization P2" of each of the ambient beam EB4 and the ambient beam EB5 incident on the viewing angle limiting device 300 at a side view angle and along the YZ plane is perpendicular to the absorption axis AX when the electrically controlled liquid crystal cell 200B is enabled, the viewing angle limiting device 300 does not substantially absorb the ambient beam EB4 and the ambient beam EB5.

In other words, when the electrically controlled liquid crystal cell 200B of this embodiment is enabled, the light intensity of the ambient beam EB2 and the ambient beam EB3 incident at different angles and along the XZ plane is reduced, but the light intensity of the ambient beam EB4 and the ambient beam EB5 incident at different angles and along the YZ plane do not change significantly (as shown in FIG. 17B).

For example, in this embodiment, after passing through the optical waveguide 100, the image beam IB1 and the image beam IB2 emitted by the image beam source (as shown in FIG. 1) leave the optical waveguide 100 through the first side-view area SV1 and the second side-view area SV2 and enter the human eye pupil EP. That is to say, the image beam source of this embodiment projects and displays an image in the second sight region SR2 and the third sight region SR3 of the electrically controlled liquid crystal cell 200B.

When the electrically controlled liquid crystal cell 200B is disabled, it is difficult to see clearly the virtual image (such as the text message shown in the upper left corner and the upper right corner in FIG. 11A) projected to the human eye by the image beam source in a real-world scene with high brightness (such as the ceiling light fixture in FIG. 11A), which makes it difficult for the user USR to read the information displayed. In contrast, when the electrically controlled liquid crystal cell 200B is enabled, only the light intensity of the ambient beam EB2 passing through the second sight region SR2 and the ambient beam EB3 passing through the third sight region SR3 is reduced significantly, such that the display images intended to be presented by the image beam source in the second sight region SR2 and the third sight region SR3 may be observed clearly by the user USR even with a bright real-world scene.

It is worth mentioning that if the image beam source would like to present display images in the fourth sight region SR4 and the fifth sight region SR5, and in order for the display images to be clearly observed by the user USR from the bright real-world scene (i.e. to increase the display contrast), the electrically controlled liquid crystal device 200B may be disabled to reduce the light intensity of the ambient beam EB4 passing through the fourth sight region SR4 and the ambient beam EB5 passing through the fifth sight region SR5.

In other words, the design of the electrically controlled liquid crystal cell 200B of present embodiment can increase the operation flexibility of the near-eye optical display apparatus 20A when displaying information.

Figure 19:
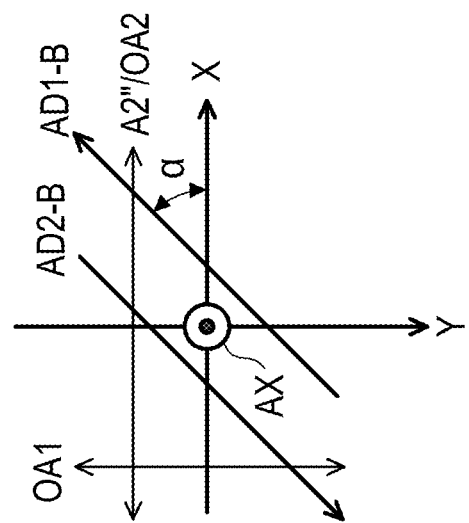
FIG. 19 is a schematic diagram showing the relationship between the axial direction of the absorption axis of the polarizing layer and the alignment direction of the alignment layer in FIG. 18.
Figure 18:
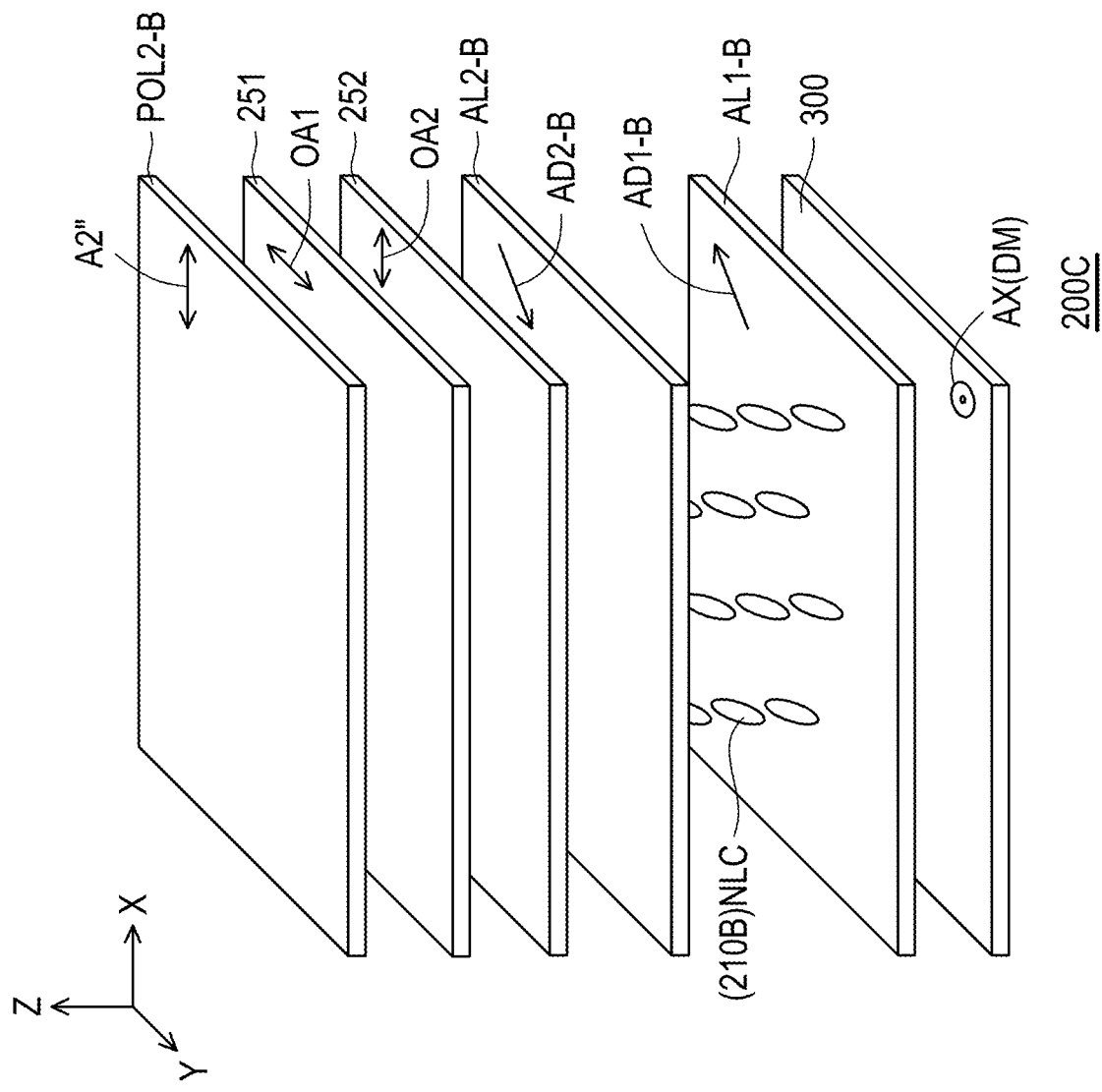
FIG. 18 is a schematic diagram of part of the film layers of the electrically controlled liquid crystal cell according to the fourth embodiment of the invention.
Figures 20A, 20B:
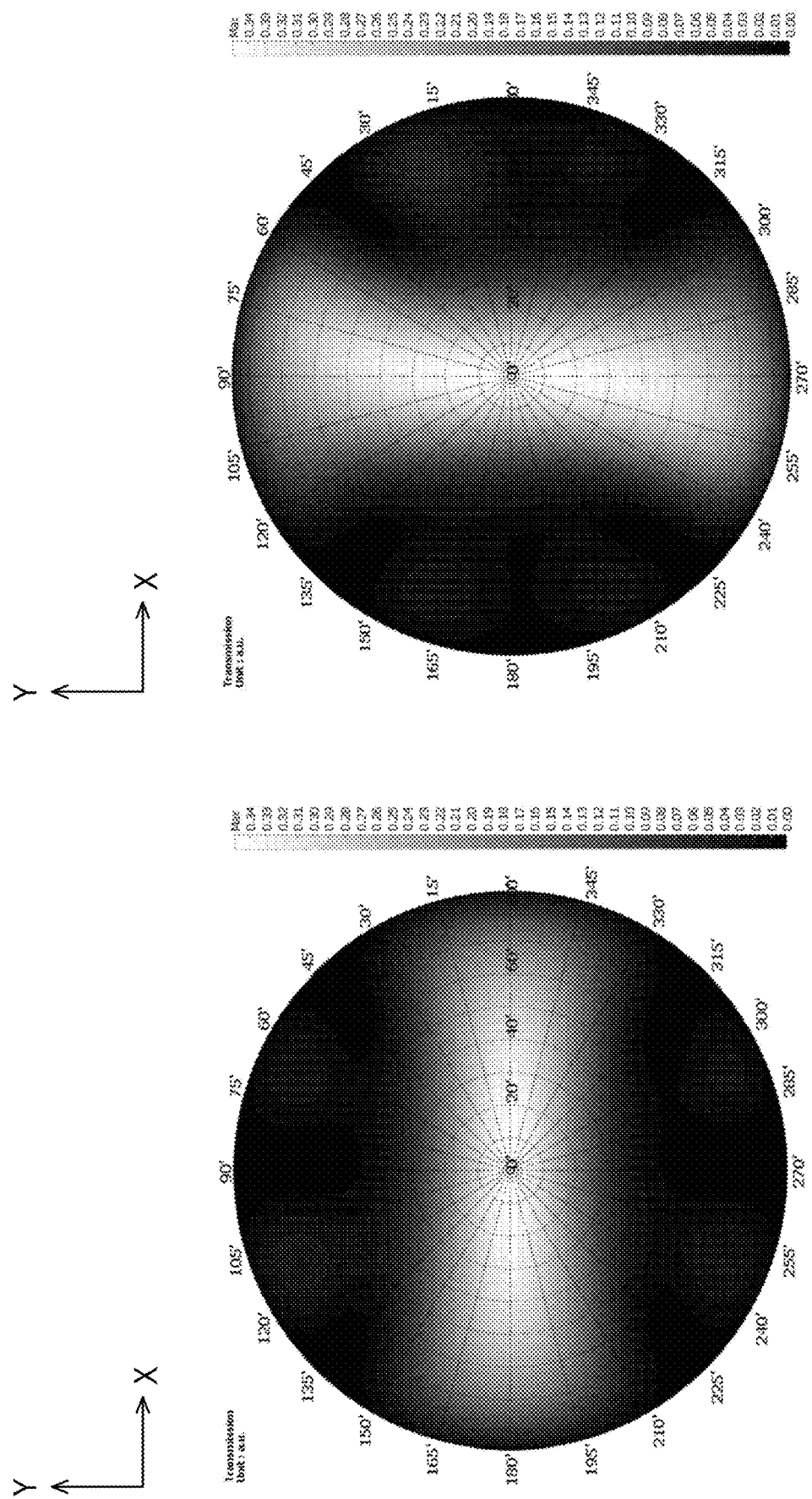
FIG. 20A is a transmittance distribution diagram of the near-eye optical display apparatus using the electrically controlled liquid crystal cell in FIG. 18 when the electrically controlled liquid crystal cell is disabled.
FIG. 20B is a transmittance distribution diagram of the near-eye optical display apparatus using the electrically controlled liquid crystal cell in FIG. 18 when the electrically controlled liquid crystal cell is enabled.

FIG. 18 is a schematic diagram of part of the film layers of the electrically controlled liquid crystal cell according to the fourth embodiment of the invention. FIG. 19 is a schematic diagram showing the relationship between the axial direction of the absorption axis of the polarizing layer and the alignment direction of the alignment layer in FIG. 18. FIG. 20A is a transmittance distribution diagram of the near-eye optical display apparatus using the electrically controlled liquid crystal cell in FIG. 18 when the electrically controlled liquid crystal cell is disabled. FIG. 20B is a transmittance distribution diagram of the near-eye optical display apparatus using the electrically controlled liquid crystal cell in FIG. 18 when the electrically controlled liquid crystal cell is enabled.

Please refer to FIG. 18 and FIG. 19. The difference between the electrically controlled liquid crystal cell 200C of this embodiment and the electrically controlled liquid crystal cell 200B in FIG. 12 is the electrically controlled liquid crystal cell 200C may optionally include a first phase retardation layer 251 and a second phase retardation layer 252. The first phase retardation layer 251 is disposed between the second polarizing layer POL2-B and the liquid crystal layer 210B, and an optical axis OA1 of the first phase retardation layer 251 is perpendicular to the second absorption axis A2" of the second polarizing layer POL2-B. The second phase retardation layer 252 is disposed between the first phase retardation layer 251 and the liquid crystal layer 210B, and an optical axis OA2 of the second phase retardation layer 252 is parallel to the second absorption axis A2" of the second polarizing layer POL2-B.

Preferably, an in-plane phase retardation of each of the first phase retardation layer 251 and the second phase retardation layer 252 is between 50 nm and 200 nm. Compare to the electrically controlled liquid crystal cell 200B in FIG. 14A, in this embodiment, through the arrangement of the first phase retardation layer 251 and the second phase retardation layer 252, the light reduction area can be further enlarged (for example, the two dark areas located on upper and lower sides of the normal view area in FIG. 20A and the two dark areas located on left and right sides of the normal view area in FIG. 20B) to increase the configuration flexibility of display information in the display area.

Figures 23A, 23B:
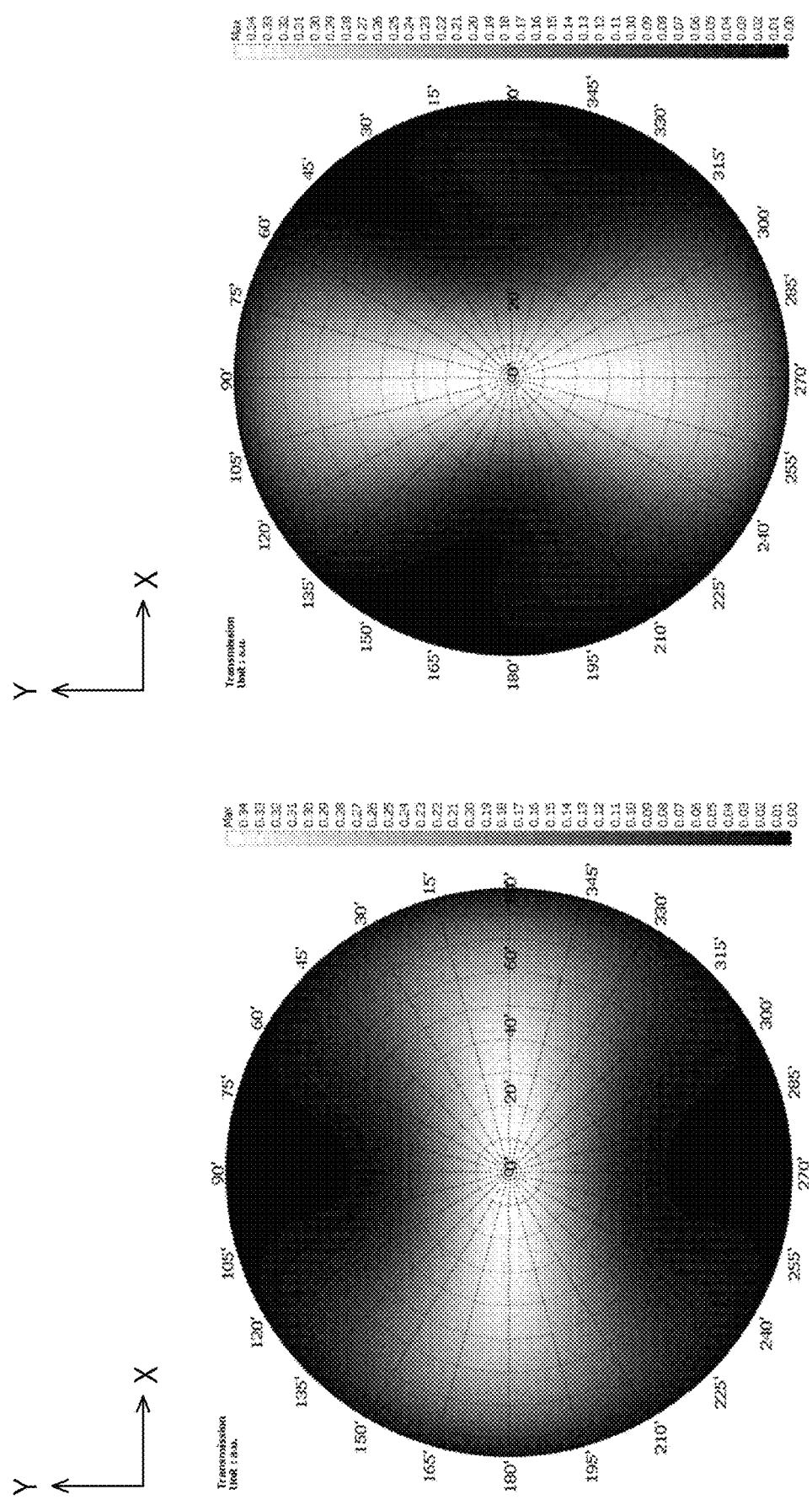
FIG. 23A is a transmittance distribution diagram of the near-eye optical display apparatus using the electrically controlled liquid crystal cell in FIG. 21 when the electrically controlled liquid crystal cell is enabled.
FIG. 23B is a transmittance distribution diagram of the near-eye optical display apparatus using the electrically controlled liquid crystal cell in FIG. 21 when the electrically controlled liquid crystal cell is disabled.

FIG. 21 is a schematic diagram of part of the film layers of the electrically controlled liquid crystal cell according to the fifth embodiment of the invention. FIG. 22 is a schematic diagram showing the relationship between the axial direction of the absorption axis of the polarizing layer and the alignment direction of the alignment layer in FIG. 21. FIG. 23A is a transmittance distribution diagram of the near-eye optical display apparatus using the electrically controlled liquid crystal cell in FIG. 21 when the electrically controlled liquid crystal cell is enabled. FIG. 23B is a transmittance distribution diagram of the near-eye optical display apparatus using the electrically controlled liquid crystal cell in FIG. 21 when the electrically controlled liquid crystal cell is disabled.

Please refer to FIG. 21 and FIG. 22. The difference between the electrically controlled liquid crystal cell 200D of this embodiment and the electrically controlled liquid crystal cell 200B in FIG. 12 is the configuration of the liquid crystal layer. Specifically, in this embodiment, the first alignment direction AD1-C of the first alignment layer AL1-C is perpendicular to the second alignment direction AD2-C of the second alignment layer AL2-C and the second absorption axis A2" of the second polarizing layer POL2-B. That is to say, the second alignment direction AD2-C of the second alignment layer AL2-C is parallel to the second absorption axis A2" of the second polarizing layer POL2-B, but the invention is not limited thereto. In other embodiment, the second alignment direction of the second alignment layer may be perpendicular to the second absorption axis A2" of the second polarizing layer POL2-B.

In this embodiment, the first alignment direction AD1-C may be antiparallel to (or parallel to) the direction Y, the second alignment direction AD2-C may be antiparallel to (or parallel to) the direction X. Therefore, when the liquid crystal layer 210C is not applied with an electric field, the plurality of positive liquid crystal molecules PLC of the liquid crystal layer 210C forms a twisted alignment from the first alignment layer AL1-C to the second alignment layer AL2-C (as shown in FIG. 21). Namely, the operating mode of the liquid crystal layer 210C of this embodiment is a twisted nematic (TN) mode.

It should be noted that the transmittance distribution (as shown in FIG. 23A) of the electrically controlled liquid crystal cell 200D which is enabled is similar to the transmittance distribution (as shown in FIG. 17A) of the electrically controlled liquid crystal cell 200 which is disabled. In contrast, the transmittance distribution (as shown in FIG. 23B) of the electrically controlled liquid crystal cell 200D which is disabled is similar to the transmittance distribution (as shown in FIG. 17B) of the electrically controlled liquid crystal cell 200 which is enabled.

In other words, in this embodiment, attenuation or blocking of ambient light in the two display areas located on two opposite sides of the normal view area along the direction X is realized by disabling the electrically controlled liquid crystal cell 200D. In the contrast, attenuation or blocking of ambient light in the two display areas located on two opposite sides of the normal view area along the direction X is realized by enabling the electrically controlled liquid crystal cell 200B for the near-eye optical display apparatus 20A.

Since the optical properties of the electrically controlled liquid crystal cell 200D of this embodiment in the disabled and enabled states are similar to the optical properties of the electrically controlled liquid crystal cell 200B in FIG. 12 in the disabled and enabled states, the description of the same technical content will be omitted. Please refer to the foregoing embodiments for the omitted parts, and will not be repeated herein.

To sum up, in the near-eye optical display apparatus of an embodiment of the invention, the electrically controlled liquid crystal cell disposed away from the light-exit surface of the optical waveguide has a first sight region and a second sight region. The first sight region relative to the viewing angle of the human eye pupil ranges from-30 degrees to 30 degrees, whereas the second sight region relative to the viewing angle range of the human eye pupil is greater than 35 degrees. When the user operates the near-eye optical display apparatus in a bright environment, the electrically controlled liquid crystal cell may be enabled to make the percentage of ratio of the average transmittance of the second sight region for the ambient beam and the average transmittance of the first sight region for the ambient beam less than or equal to 50% to increase the display contrast of the near-eye optical display apparatus in the second sight region, as a way to improve the visual experience of the user.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A near-eye optical display apparatus, comprising:
an optical waveguide, having a first light incident surface, a light-exit surface and a second light incident surface, the light-exit surface and the second light incident surface respectively connected to the first light incident surface and opposite to each other;
an image beam source, disposed on one side of the first light incident surface of the optical waveguide and adapted to provide an image beam, wherein the image beam exits from the light-exit surface after being transmitted through the optical waveguide; and
an electrically controlled liquid crystal cell, disposed on one side of the second light incident surface of the optical waveguide and comprising a first sight region, a second sight region and a third sight region, wherein the third sight region, the first sight region and the second sight region are disposed in a first direction, the first sight region relative to a viewing angle range of a human eye pupil is between −30 degrees and 30 degrees in the first direction, the second sight region relative to the viewing angle range of the human eye pupil is greater than 35 degrees in the first direction, the third sight region relative to the viewing angle range of the human eye pupil is less than −35 degrees in the first direction, the light-exit surface of the optical waveguide has a normal view area, a first side-view area and a second side-view area respectively corresponding to the first sight region, the second sight region and the third sight region of the electrically controlled liquid crystal cell, and the image beam leaves the optical waveguide only through the first side-view area and the second side-view area of the light-exit surface,
wherein when a driving voltage is supplied to the electrically controlled liquid crystal cell, a percentage of ratio of an average transmittance of the second sight region of the electrically controlled liquid crystal cell for a 45-degree incident ambient beam incident on the human eye pupil and an average transmittance of the first sight region of the electrically controlled liquid crystal cell for a vertically incident ambient beam incident on the human eye pupil is less than or equal to 50%.

2. The near-eye optical display apparatus according to claim 1, wherein the electrically controlled liquid crystal cell comprises:
a first polarizing layer and a second polarizing layer respectively having a first absorption axis and a second absorption axis, wherein the first absorption axis is perpendicular to the second absorption axis;
a first alignment layer and a second alignment layer disposed between the first polarizing layer and the second polarizing layer, wherein a first alignment direction of the first alignment layer is perpendicular to a second alignment direction of the second alignment layer, and the first absorption axis is perpendicular or parallel to the first alignment direction; and
a liquid crystal layer sandwiched between the first alignment layer and the second alignment layer,
wherein an included angle between the first alignment direction or the second alignment direction and the first direction is 45 degrees.

3. The near-eye optical display apparatus according to claim 2, further comprising:
a half-wave plate disposed on one side of the electrically controlled liquid crystal cell away from the optical waveguide, wherein an included angle between an axial direction of a slow axis of the half-wave plate and the first direction is 22.5 degrees or 67.5 degrees.

4. The near-eye optical display apparatus according to claim 2, wherein when the driving voltage is supplied to the electrically controlled liquid crystal cell, a percentage of ratio of an average transmittance of the third sight region of the electrically controlled liquid crystal cell for a −45-degree incident the ambient beam incident on the human eye pupil and an average transmittance of the first sight region of the electrically controlled liquid crystal cell for the vertically incident ambient beam incident on the human eye pupil is greater than or equal to 60%.

5. The near-eye optical display apparatus according to claim 1, wherein the electrically controlled liquid crystal cell comprises:
a first polarizing layer and a second polarizing layer respectively having a first absorption axis and a second absorption axis, wherein the first absorption axis is parallel to the second absorption axis;
a first alignment layer and a second alignment layer disposed between the first polarizing layer and the second polarizing layer, wherein a first alignment direction of the first alignment layer is parallel or antiparallel to a second alignment direction of the second alignment layer, and the first absorption axis is perpendicular or parallel to the first alignment direction; and
a liquid crystal layer sandwiched between the first alignment layer and the second alignment layer, wherein the first alignment direction and the second alignment direction are perpendicular to the first direction.

6. The near-eye optical display apparatus according to claim 5, wherein the electrically controlled liquid crystal cell further comprises:
a phase retardation layer disposed between the first polarizing layer and the second polarizing layer, wherein a phase retardation in a thickness direction of the phase retardation layer is between 200 nm and 400 nm.

7. The near-eye optical display apparatus according to claim 5, wherein when the driving voltage is supplied to the electrically controlled liquid crystal cell, a percentage of ratio of an average transmittance of the third sight region of the electrically controlled liquid crystal cell for a −45-degree incident ambient beam incident on the human eye pupil and an average transmittance of the first sight region of the electrically controlled liquid crystal cell for the vertically incident ambient beam incident on the human eye pupil is less than or equal to 50%.

8. The near-eye optical display apparatus according to claim 1, wherein the ambient beam comprises a vertically incident ambient beam and a 45-degree incident ambient beam, and
when the driving voltage is supplied to the electrically controlled liquid crystal cell, the first sight region and the second sight region of the electrically controlled liquid crystal cell have a same average transmittance for the vertically incident ambient beam, and the second sight region and the first sight region of the electrically controlled liquid crystal cell have a same average transmittance for the 45-degree incident ambient beam.

9. The near-eye optical display apparatus according to claim 8, wherein when the driving voltage is not provided to the electrically controlled liquid crystal cell, the first sight region and the second sight region of the electrically controlled liquid crystal cell have a same average transmittance for the vertically incident ambient beam, and the first sight region and the second sight region of the electrically controlled liquid crystal cell have a same average transmittance for the 45-degree incident ambient beam.

10. The near-eye optical display apparatus according to claim 1, wherein the electrically controlled liquid crystal cell comprises:
a viewing angle limiting device, overlapping the second light incident surface of the optical waveguide, and the viewing angle limiting device comprises:
a polymer substrate; and
a plurality of dye molecules, dispersedly arranged in the polymer substrate, the dye molecules have a first absorption coefficient in a thickness direction of the polymer substrate, the dye molecules have a second absorption coefficient in a direction perpendicular to the thickness direction, and a ratio of the first absorption coefficient to the second absorption coefficient is between 10 and 1000;
a second polarizing layer, overlapping the viewing angle limiting device, the second polarizing layer has an absorption axis, and the absorption axis is parallel to the first direction;
a first alignment layer and a second alignment layer, disposed between the viewing angle limiting device and the second polarizing layer, wherein a first alignment direction of the first alignment layer is antiparallel to a second alignment direction of the second alignment layer, and an included angle between the absorption axis of the second polarizing layer and the second alignment direction of the second alignment layer is 45 degrees; and
a liquid crystal layer, sandwiched between the first alignment layer and the second alignment layer.

11. The near-eye optical display apparatus according to claim 10, wherein the electrically controlled liquid crystal cell further comprises:
a first phase retardation layer, disposed between the second polarizing layer and the liquid crystal layer, wherein an optical axis of the first phase retardation layer is perpendicular to the absorption axis of the second polarizing layer, and an in-plane phase retardation of the first phase retardation layer is between 50 nm and 200 nm.

12. The near-eye optical display apparatus according to claim 11, wherein the electrically controlled liquid crystal cell further comprises:
a second phase retardation layer, disposed between the first phase retardation layer and the liquid crystal layer, wherein an optical axis of the second phase retardation layer is parallel to the absorption axis of the second polarizing layer, and an in-plane phase retardation of the second phase retardation layer is between 50 nm and 200 nm.

13. The near-eye optical display apparatus according to claim 1, wherein the electrically controlled liquid crystal cell comprises:
a viewing angle limiting device, overlapping the second light incident surface of the optical waveguide, and the viewing angle limiting device comprises:
a polymer substrate; and
a plurality of dye molecules, dispersedly arranged in the polymer substrate, the dye molecules have a first absorption coefficient in a thickness direction of the polymer substrate, the dye molecules have a second absorption coefficient in a direction perpendicular to the thickness direction, and a ratio of the first absorption coefficient to the second absorption coefficient is between 10 and 1000;

a second polarizing layer, overlapping the viewing angle limiting device, the second polarizing layer has an absorption axis, and the absorption axis is parallel to the first direction;

a first alignment layer and a second alignment layer, disposed between the viewing angle limiting device and the second polarizing layer, wherein a first alignment direction of the first alignment layer is perpendicular to a second alignment direction of the second alignment layer, and the absorption axis of the second polarizing layer is parallel to or perpendicular to the second alignment direction of the second alignment layer; and a liquid crystal layer, sandwiched between the first alignment layer and the second alignment layer.

\* \* \* \* \*